United States Patent
Hwang et al.

(10) Patent No.: US 12,259,723 B2
(45) Date of Patent: Mar. 25, 2025

(54) METHOD FOR TERMINAL DEVICE MOUNTED IN VEHICLE TO TRANSMIT IMAGE AND METHOD FOR REMOTE CONTROL DEVICE FOR CONTROLLING TRAVEL OF VEHICLE TO RECEIVE IMAGE

(71) Applicant: Samsung Electronics Co., Ltd., Suwon-si (KR)

(72) Inventors: Sunghee Hwang, Suwon-si (KR); Kyunghun Jung, Suwon-si (KR); Hakju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 868 days.

(21) Appl. No.: 17/292,843

(22) PCT Filed: Jul. 31, 2019

(86) PCT No.: PCT/KR2019/009507
§ 371 (c)(1),
(2) Date: May 11, 2021

(87) PCT Pub. No.: WO2020/101146
PCT Pub. Date: May 22, 2020

(65) Prior Publication Data
US 2021/0397181 A1 Dec. 23, 2021

(30) Foreign Application Priority Data
Nov. 13, 2018 (KR) .................. 10-2018-0139410

(51) Int. Cl.
*G05D 1/00* (2024.01)
*H04N 7/18* (2006.01)

(52) U.S. Cl.
CPC ...... *G05D 1/0038* (2013.01); *B60R 2300/105* (2013.01); *B60R 2300/303* (2013.01); *B60R 2300/306* (2013.01); *H04N 7/181* (2013.01)

(58) Field of Classification Search
CPC ............ G05D 1/0038; B60R 2300/105; B60R 2300/303; B60R 2300/306; H04N 7/181
See application file for complete search history.

(56) References Cited

U.S. PATENT DOCUMENTS

| 8,738,197 B2 | 5/2014 | An et al. |
| 9,983,591 B2 | 5/2018 | Micks et al. |

(Continued)

FOREIGN PATENT DOCUMENTS

| JP | 2017-123627 A | 7/2017 |
| JP | 2018-093311 A | 6/2018 |

(Continued)

OTHER PUBLICATIONS

International Search Report dated Nov. 12, 2019, issued in International Patent Application No. PCT/KR2019/009507.

(Continued)

*Primary Examiner* — Kyu Chae
(74) *Attorney, Agent, or Firm* — Jefferson IP Law, LLP

(57) ABSTRACT

A method and device for efficiently transmitting a plurality of pictures are provided. Also, provided are a method and device for efficiently receiving a plurality of transmitted pictures. Provided is a picture transmitting method including obtaining a plurality of input pictures, generating a packed picture by combining the plurality of input pictures based on a packing structure, and generating and transmitting a bitstream including packing structure information and the packed picture.

15 Claims, 25 Drawing Sheets

(56) References Cited

U.S. PATENT DOCUMENTS

| | | | |
|---|---|---|---|
| 10,893,214 B2 | 1/2021 | Sunaga | |
| 2003/0125854 A1* | 7/2003 | Kawasaki | G07C 5/008 |
| | | | 701/431 |
| 2009/0318121 A1* | 12/2009 | Marumoto | G07C 5/085 |
| | | | 455/414.1 |
| 2013/0223539 A1* | 8/2013 | Lee | H04N 21/4621 |
| | | | 709/224 |
| 2014/0086337 A1* | 3/2014 | Wang | H04N 19/70 |
| | | | 375/240.26 |
| 2016/0297545 A1* | 10/2016 | Yang | G05D 1/0044 |
| 2017/0041587 A1 | 2/2017 | Wei | |
| 2017/0136948 A1 | 5/2017 | Sypitkowski et al. | |
| 2019/0302761 A1* | 10/2019 | Huang | G05D 1/0016 |
| 2019/0349598 A1* | 11/2019 | Aminlou | H04N 19/105 |
| 2019/0355171 A1* | 11/2019 | Ashley | G06T 15/04 |
| 2020/0084428 A1 | 3/2020 | Oh et al. | |
| 2021/0114616 A1* | 4/2021 | Altman | H04N 21/6131 |
| 2021/0274146 A1* | 9/2021 | Oh | H04N 13/194 |

FOREIGN PATENT DOCUMENTS

| | | | |
|---|---|---|---|
| KR | 10-2011-0058384 A | 6/2011 |
| KR | 10-2018-0067046 A | 6/2018 |
| KR | 10-2018-0107149 A | 10/2018 |
| KR | 10-1915729 B1 | 11/2018 |

OTHER PUBLICATIONS

Korean Office Action dated Nov. 28, 2023, issued in Korean Application No. 10-2018-0139410.

\* cited by examiner

FIG. 1A
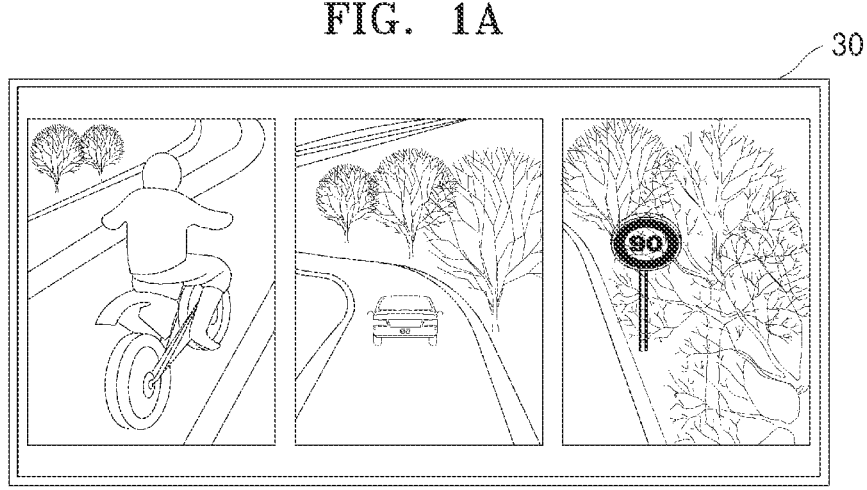
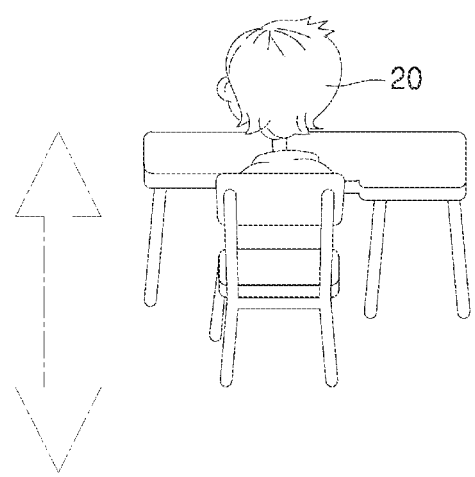
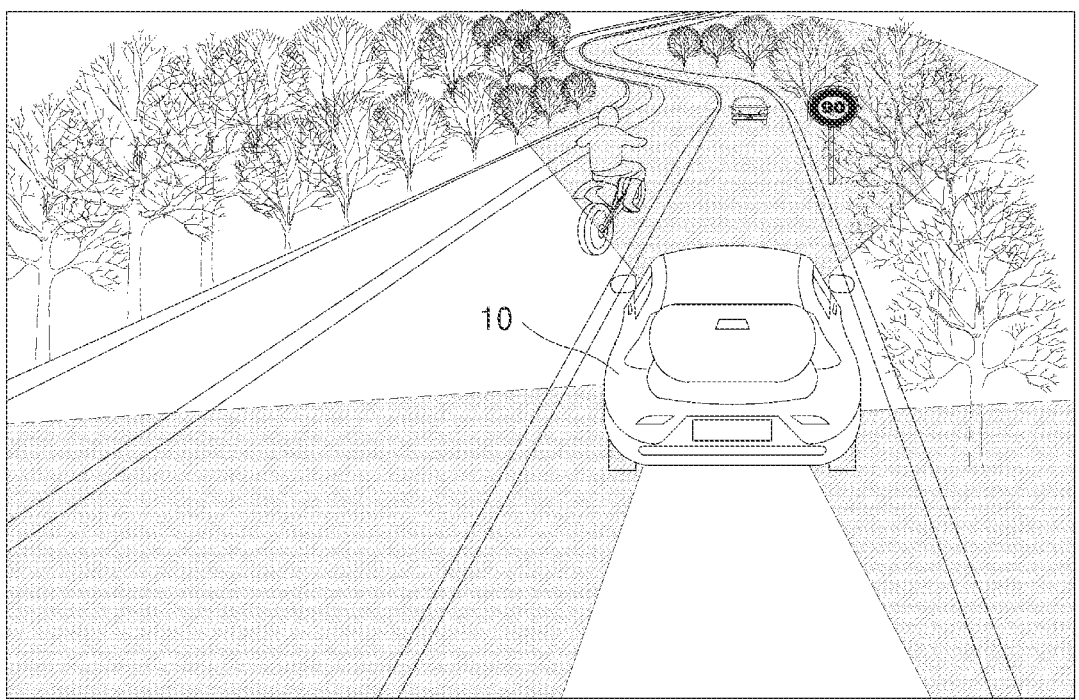

FIG. 6

SDP offer — 610

```
m=video 49154 RTP/AVP 99
b=AS:20000
b=RS:0
b=RR:5000
a=rtpmap:99 H265/90000
a=fmtp:99 profile-id=1; level-id=51
a=imageattr:99 send [x=3840,y=2160]
a=subimage:99 send [fl,11,11,1290,730] [fr,1301,11,2580,730] [sl,11,741,650,1220]
 [cr,661,741,1300,1220] [sr,1311,741,1950,1220]
a=sendonly
```

SDP answer — 630

```
m=video 49154 RTP/AVP 99
b=AS:15000
b=RS:0
b=RR:5000
a=rtpmap:99 H265/90000
a=fmtp:99 profile-id=1; level-id=51
a=imageattr:99 send [x=3840,y=2160]
a=subimage:99 send [fl,11,11,1290,730] [fr,1301,11,2580,730] [sl,11,741,650,1220]
 [cr,661,741,1300,1220] [sr,1311,741,1950,1220]
a=recvonly
```

FIG. 16
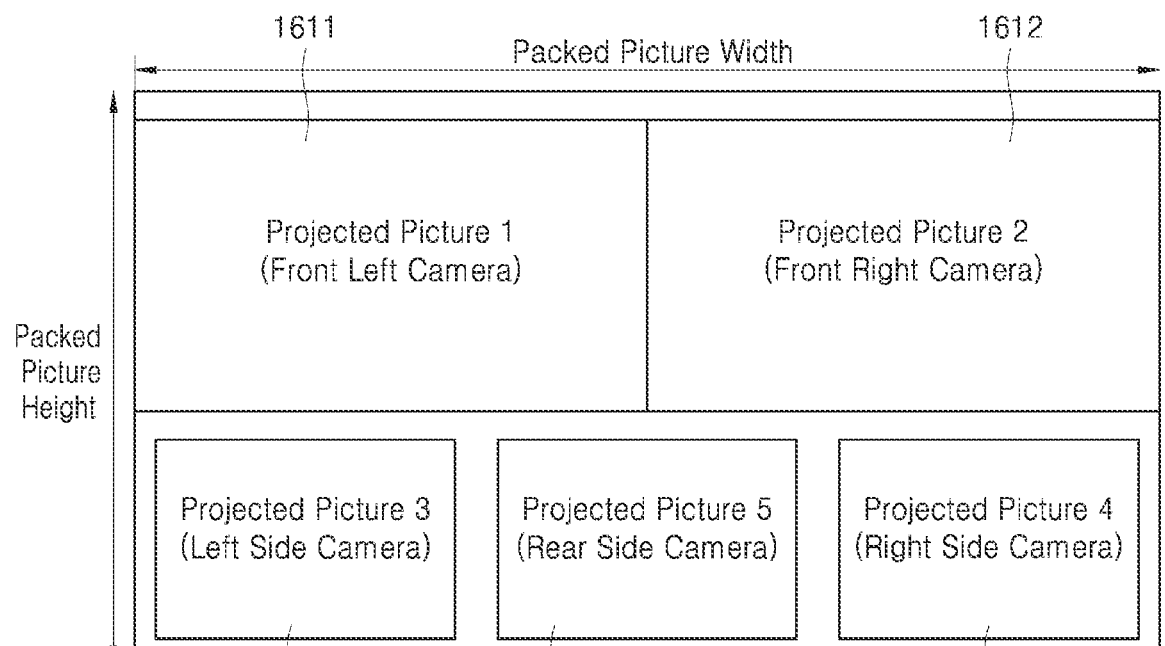
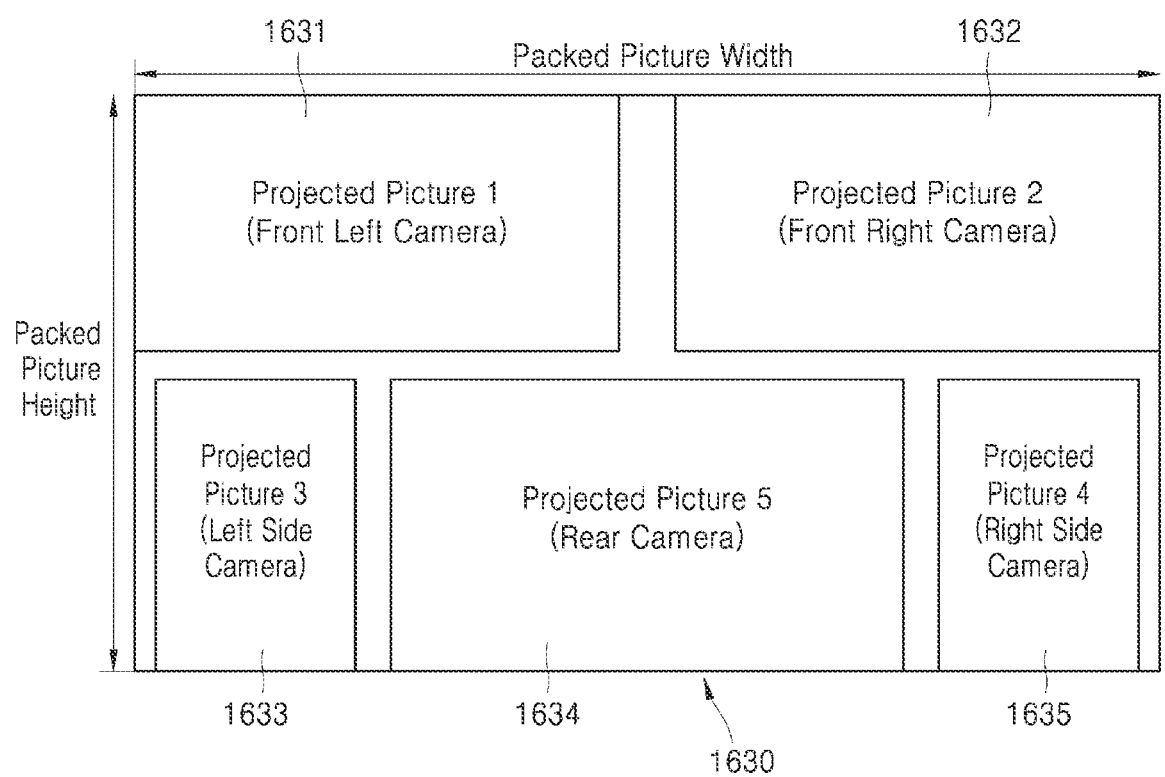

METHOD FOR TERMINAL DEVICE MOUNTED IN VEHICLE TO TRANSMIT IMAGE AND METHOD FOR REMOTE CONTROL DEVICE FOR CONTROLLING TRAVEL OF VEHICLE TO RECEIVE IMAGE

TECHNICAL FIELD

The disclosure relates to a method and device for efficiently transmitting a plurality of pictures. Also, the disclosure relates to a method and device for efficiently receiving a plurality of transmitted pictures.

BACKGROUND ART

As advances in communication technologies have been made, high speed transmission of a large amount of data has become feasible, thus allowing even more diversified services to be provided through a wireless communication system. For example, according to an autonomous driving system, a vehicle may be automatically controlled based on pictures obtained by the vehicle, in which a plurality of cameras are mounted. Alternatively, the vehicle may receive pictures that are obtained by nearby vehicles and may use the received pictures as information for safe driving. Alternatively, the vehicle may be remotely controlled based on pictures obtained by the vehicle.

DESCRIPTION OF EMBODIMENTS

Technical Problem

Provided are methods of efficiently transmitting and receiving a plurality of pictures by using a limited resource.

Solution to Problem

According to an aspect of an embodiment, a method, performed by a terminal device mounted in a vehicle, of transmitting a picture to a remote control device for controlling driving of the vehicle, includes: transmitting, to the remote control device, location information of a plurality of cameras mounted in the vehicle; determining a packing structure based on a driving state of the vehicle; generating a packed picture by combining a plurality of input pictures captured by the plurality of cameras based on the packing structure; and transmitting a bitstream including the packed picture.

According to another aspect of an embodiment, a terminal device mounted in a vehicle communicating with a remote control device for controlling driving of the vehicle includes: a communicator configured to transmit, to the remote control device, location information of a plurality of cameras mounted in the vehicle; and at least one processor configured to determine a packing structure based on a driving state of the vehicle and generate a packed picture by combining a plurality of input pictures captured by the plurality of cameras based on the packing structure, wherein the communicator is further configured to transmit a bitstream including the packed picture.

According to another aspect of an embodiment, method, performed by a remote control device for controlling driving of a vehicle, of receiving a picture from a terminal device mounted in the vehicle, includes: receiving location information of a plurality of cameras mounted in the vehicle from the terminal device; transmitting a control signal for controlling the driving of the vehicle and packing structure information; receiving a bitstream; obtaining a packed picture from the bitstream; obtaining a plurality of output pictures from the packed picture based on the packing structure information; and outputting the plurality of output pictures.

According to another aspect of an embodiment, a remote control device for controlling driving of a vehicle communicating with a terminal device mounted in the vehicle includes: a communicator configured to receive location information of a plurality of cameras mounted in the vehicle from the terminal device, transmit packing structure information and a control signal for controlling driving of the vehicle, and receive a bitstream; and at least one processor configured to obtain a packed picture from the bitstream, obtain a plurality of output pictures from the packed picture based on the packing structure information, and output the plurality of output pictures.

Advantageous Effects of Disclosure

According to embodiments, a picture communication system may transmit and receive input pictures by packing the input pictures in one packed picture, regardless of the number of input pictures, and thus, may maximize the amount of information that a user receives.

BRIEF DESCRIPTION OF DRAWINGS

FIG. 1A is a diagram for describing a remotely controlled autonomous driving system according to an embodiment.

FIG. 6 illustrates an example in which a picture communication system negotiates a picture transmission condition, according to an embodiment.

FIGS. 13 through 16 illustrate an example of packing structure information transmitted together with a packed picture, according to an embodiment.

BEST MODE

Figure 1B:
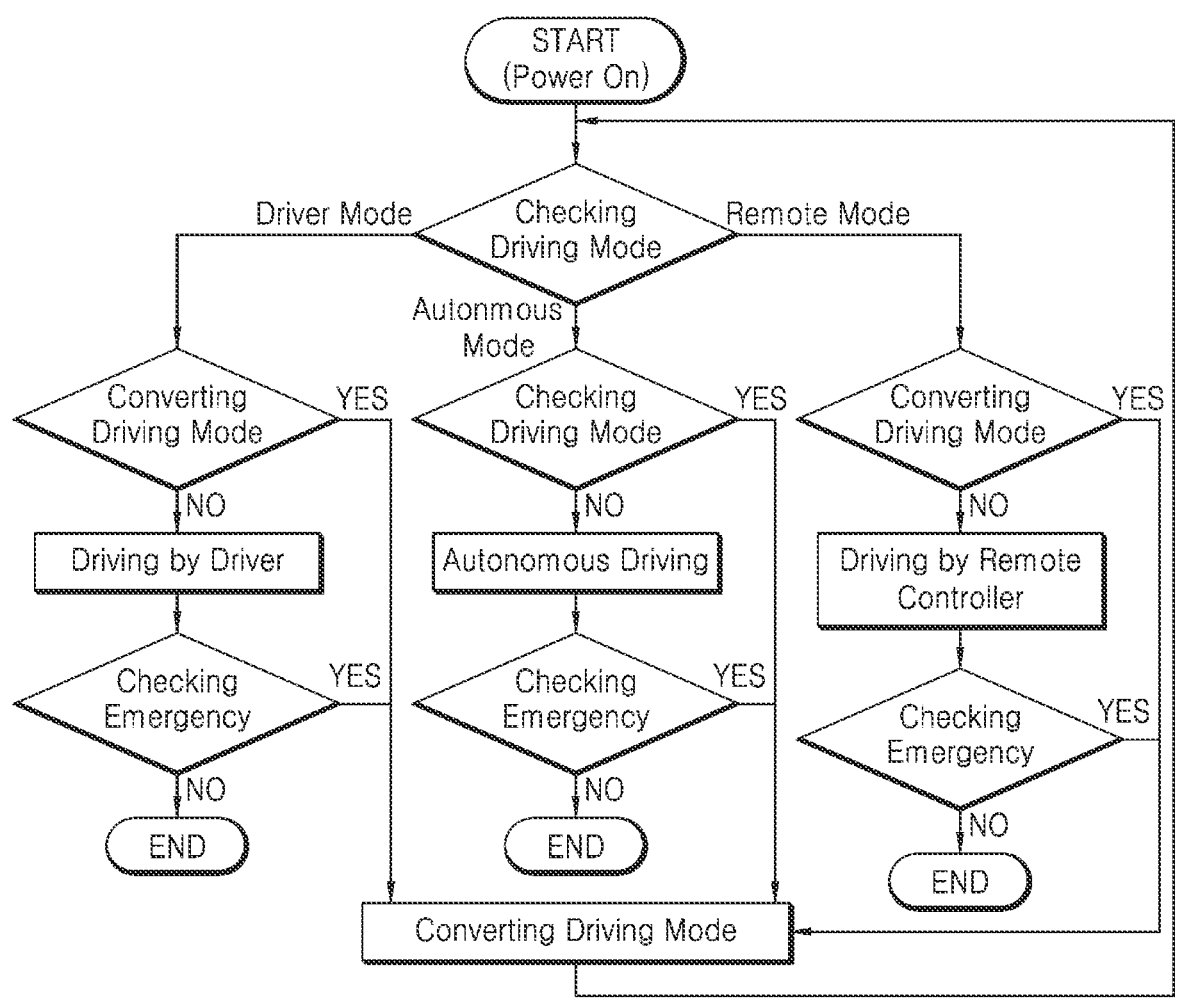
FIG. 1B is a diagram for describing a method, performed by a host vehicle, of driving in one of a normal driving mode, an autonomous driving mode, and a remote control mode.

According to an aspect of an embodiment, a method, performed by a terminal device mounted in a vehicle, of transmitting a picture to a remote control device for controlling driving of the vehicle, includes: transmitting location information of a plurality of cameras mounted in the vehicle to the remote control device; determining a packing structure based on a driving state of the vehicle; generating a packed picture by combining a plurality of input pictures captured by the plurality of cameras based on the packing structure; and transmitting a bitstream including the packed picture.

MODE OF DISCLOSURE

Hereinafter, embodiments of the disclosure will be described in detail with reference to the accompanying drawings for one of ordinary skill in the art to easily execute the disclosure. However, the disclosure may have different forms and should not be construed as being limited to the embodiments described herein. Also, in the drawings, parts not related to descriptions are omitted for the clear description of the disclosure, and throughout the specification, like reference numerals are used for like elements.

One or more embodiments of the disclosure may be described as functional block components and various processing operations. All or part of such functional blocks may be realized by any number of hardware and/or software components configured to perform the specified functions. For example, the functional blocks of the disclosure may be implemented with one or more micro-processors or with circuit structures for certain functions. Also, for example, the functional blocks of the disclosure may be implemented with various programming or scripting languages. The functional blocks may be implemented with algorithms executed by one or more processors. Furthermore, the disclosure could employ conventional techniques for electronics configuration, signal processing and/or data control.

Furthermore, the connecting lines, or connectors shown in the drawings are intended to represent example functional relationships and/or physical or logical couplings between the various elements. It should be noted that many alternative or additional functional relationships, physical connections or logical connections may be present in a practical device.

In this specification, a "picture" may include all of a still image, a video, a video frame, and/or a video stream captured and transmitted by a camera or a sensor.

The term "picture" used throughout this specification not only may indicate its direct referent, but also may be used as an inclusive term to refer to various forms of video image data known in the art, such as an "image," a "frame," a "field," a "slice," or the like. For example, a "picture" may denote one of a plurality of pictures or a plurality of frames included in a video stream or may denote a video stream including a plurality of pictures or a plurality of frames.

The term "projected picture" used throughout this specification may denote each of a plurality of pictures included in a "packed picture." A projected picture may be a partial picture of a packed picture generated by projecting an input picture on the packed picture. The "projected picture" may also be referred to as a "sub-picture," or a "partial picture."

Hereinafter, the disclosure is described in detail with reference to the accompanying drawings.

FIG. 1A is a diagram for describing an autonomous driving system that is remotely controlled, according to an embodiment.

The autonomous driving system may collect, process, work, store, or transmit information or commands related to autonomous driving of a host vehicle or may control autonomous driving. The host vehicle may denote a vehicle supporting the autonomous driving system and controlled by the autonomous driving system. The autonomous driving system may include a terminal device mounted in the host vehicle or a terminal device remotely controlling the host vehicle outside the host vehicle. The autonomous driving system may sense a surrounding condition and control the host vehicle by using information collected from a plurality of cameras mounted in the host vehicle. Alternatively, the information collected from the host vehicle may be transmitted to an autonomous driving system of another vehicle to facilitate safe autonomous driving of the other vehicle.

Depending on conditions, the host vehicle may be normally driven by a driver in the host vehicle, autonomously driven, or remotely controlled by an external device, an external server, or a human being.

For example, in the autonomous driving system, in the case of emergency, the autonomous driving may be stopped and remote controlling by an external device, an external server, or a human being may be required. As illustrated in FIG. 1A, for the host vehicle 10 to be remotely controlled by a user 20, pictures 30 related to a surrounding condition of the host vehicle 10 may have to be transmitted to the user 20.

As illustrated in FIG. 1B, a host vehicle according to an embodiment may be driven not only in an autonomous driving mode, but also in a normal driving mode or a remote control mode. For example, the host vehicle may operate in a normal driving mode (or a driver mode). The normal driving mode refers to a mode in which a vehicle is driven by a driver. An advanced driver assistance system may be included in the normal driving mode. Also, the host vehicle may operate in an autonomous driving mode. The autonomous driving mode refers to a mode in which a vehicle performs self-driving without human involvement. Also, the host vehicle may operate in a remote control mode (or a remote mode). The remote control mode refers to a mode in which a device or a human being remotely controls driving of a vehicle.

The host vehicle according to an embodiment may identify a driving mode, thereby determining in which of the normal driving mode, the autonomous driving mode, and the remote control mode, the host vehicle is to operate. When the driving mode is changed, the host vehicle may drive in the changed driving mode. For example, while driving, the host vehicle may determine whether or not an emergency situation so as not to retain a current driving mode has occurred, and when the emergency situation has occurred, the vehicle may change the driving mode directly or by communication with a network.

In order that the host vehicle according to an embodiment drives in the remote control mode, pictures and data about an environment around the host vehicle may have to be transmitted to a remote control device. The host vehicle (or a terminal device mounted in the host vehicle) may negotiate with the network to form a session to transmit the pictures and the data.

In order that the host vehicle 10 is remotely safely controlled, pictures in all directions around the host vehicle 10 may have to be transmitted without delay. However, it may be difficult to separately transmit the pictures in all directions without delay, due to limited frequency resources. Thus, a technique to efficiently transmit a plurality of pictures by packing the plurality of pictures in one picture may be used.

Figure 2:
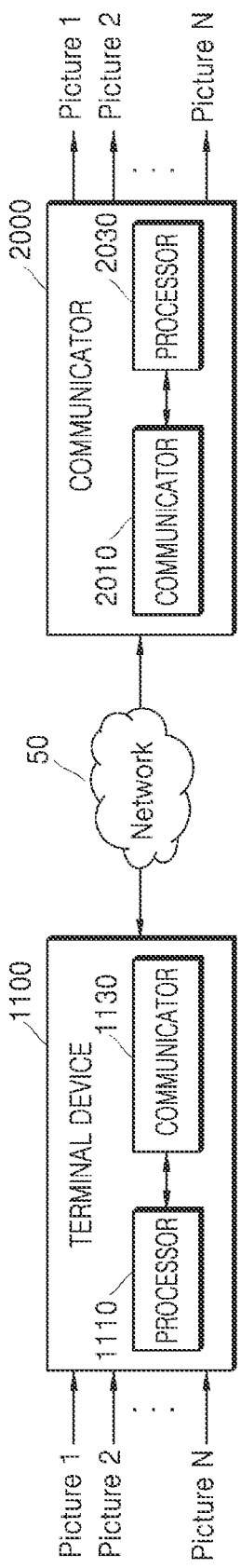
FIG. 2 is a diagram of a picture communication system according to an embodiment.

FIG. 2 is a diagram of a picture communication system according to an embodiment.

The picture communication system according to an embodiment may include a terminal device 1100 mounted in a vehicle and a remote control device 2000 configured to control driving of the vehicle. The terminal device 1100 and the remote control device 2000 may be connected to each other through a network and transmit and receive a picture and a signal to and from each other. Surrounding pictures of the vehicle that are captured by a plurality of cameras mounted in the vehicle may be transmitted through the network and displayed on a display of the remote control device 2000 to be used for remotely controlling the vehicle.

The terminal device 1100 and the remote control device 2000 according to an embodiment may be connected to each other using various communication methods. For example, the terminal device 1100 and the remote control device 2000 according to an embodiment may be connected to each other using various communication methods, such as 4G (or long term evolution (LTE)), 5G (or new radio (NR)), WiFi, etc.

When the picture communication system according to an embodiment uses an LTE communication method, the terminal device 1100 and the remote control device 2000 may be connected to an LTE base station eNodeB, and the LTE base station eNodeB may be connected to an evolved packet core (EPC), a core network of an LTE communication system. When the picture communication system according to an embodiment uses a next generation mobile communication method (for example, the NR), the terminal device 1100 and the remote control device 2000 may be connected to a next generation base station gNodeB, and the next generation base station gNodeB may be connected to a 5G core, a core network of an NR communication system.

Also, the terminal device 1100 and the remote control device 2000 may be connected to each other through a radio access network (RAN) and may access a data network (for example, a data server, the Internet, etc.) through the RAN.

The terminal device 1100 according to an embodiment may obtain a plurality of pictures from a plurality of picture sources and may process the obtained pictures via a processor 1110. For example, the plurality of pictures sources may indicate a plurality of cameras. Alternatively, although not shown in the drawings, the terminal device 1100 may include a picture source unit, and the picture source unit may obtain or generate a plurality of pictures. In this specification, a "picture" may denote a piece of frame included in a video stream or a video stream including sequential frames.

For example, in a remote control system of a vehicle, a picture source may include various sensors (for example, a radar sensor, a Lidar sensor, etc.) mounted in the vehicle, a camera mounted in the vehicle, which is configured to capture surrounding information of the vehicle, other nearby vehicles, other electronic devices connected through a network, a server, etc. Hereinafter, for convenience of explanation, descriptions will be given based on an example in which the picture source is a camera. However, embodiments are not limited to the example in which the picture source is a camera. The descriptions hereinafter may be applied to cases in which pictures are received from various picture sources.

The terminal device 1100 may generate one packed picture from a plurality of pictures. The terminal device 1100 may generate an encoded packed picture by compressing the packed picture by using a video codec and may output an IP stream including the encoded packed picture. The terminal device 1100 may output the IP stream including packing structure information as well as the encoded packed picture. The packing structure information may be included in description metadata describing the packed picture. A communicator 1130 of the terminal device 1100 may transmit the IP stream including the encoded packed picture to the remote control device 2000 through the network. For example, the communicator 1130 may include an RAN transmitter configured to transmit an IP stream through an RAN.

The terminal device 1100 may determine a video parameter (for example, a codec, a data rate, a resolution, a packing structure, size information of a vehicle, location information of a camera, direction information of the camera, etc.) required for transmitting the packed picture by performing negotiation with a receiving system and based on a result of the negotiation, may transmit the packed picture. FIG. 1 illustrates the remote control device 2000 as an example of the receiving system.

The remote control device 2000 according to an embodiment may include a communicator 2010 configured to process data received through a network and output an IP stream. For example, the communicator 2010 may include an RAN receiver configured to output an IP stream received through an RAN.

A processor 2030 of the remote control device 2000 according to an embodiment may process the IP stream received from the communicator 2010 and output a plurality of pictures. The remote control device 2000 according to an embodiment may decode an encoded packed picture included in the IP stream to obtain the decoded packed picture and may perform depacking on the decoded packed picture to output the plurality of pictures. The remote control device 2000 may output the plurality of pictures by performing depacking on the decoded packed picture by using the packing structure information included in the IP stream. Although not illustrated in FIG. 1, the remote control device 2000 may include at least one display configured to display the plurality of pictures.

The remote control device 2000 determine a video parameter (for example, a codec, a data rate, a resolution, a packing structure, size information of a vehicle, location information of a camera, direction information of the camera, etc.) required for receiving the packed picture by performing negotiation with a transmission system and based on a result of the negotiation, may receive the packed picture. FIG. 1 illustrates an example in which the transmission system is the terminal device 1100.

The terminal device 1100 according to an embodiment of the disclosure may determine pieces of information about the video parameter of a packed picture to be transmitted via negotiation with the remote control device 2000 and may transmit the packed picture based on the determined pieces of information. After the negotiation, when an update to the video parameter is required during transmission of the packed picture (for example, when a data rate is changed, a packing structure is changed, etc.), the terminal device 1100 may update the relevant information via re-negotiation and transmit the packed picture according to the updated information.

The picture communication system according to an embodiment may transmit and receive the packed picture through a user plane and transmit or process control data, such as a session description protocol (SDP) through a control plane. The user plane may indicate a configuration for transmitting and processing user data (for example, a packet, a flow, a traffic, etc.) through a network. The control plane may indicate a configuration for transmitting and processing control data. The negotiation between the terminal device 1100 and the remote control device 2000 may be performed through the control plane, such as an SDP, or a control channel, such as a real-time transport protocol control protocol (RTCP) in the user plane.

A method of negotiating a picture transmission condition before the picture communication system according to an embodiment transmits and receives a picture is described in detail with reference to FIG. 3.

Figure 3:
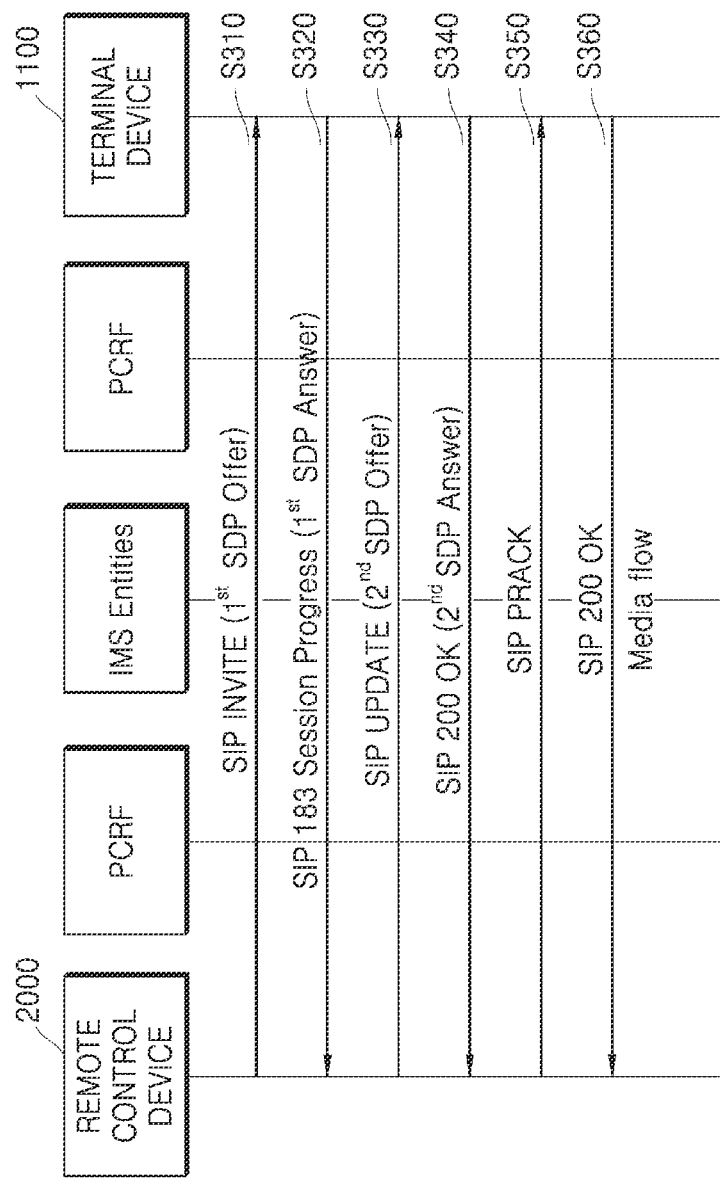
FIG. 3 illustrates a process in which a picture communication system negotiates a picture transmission condition, according to an embodiment.

FIG. 3 illustrates a process in which the picture communication system negotiates a picture transmission condition, according to an embodiment.

The remote control device 2000 according to an embodiment may describe information, for example, a type of a picture compressor, a bit rate, a size of a picture, a resolution of a picture, etc., in an SDP offer and may load the SDP offer in a session initiation protocol (SIP) message. The remote control device 2000 may start a mutual negotiation with the terminal device 1100 by transmitting the SIP message to the terminal device 1100 (S310). The SDP offer may include information about a video parameter required for a transmission of a packed picture.

As illustrated in FIG. 3, according to an embodiment, the SIP message including the SDP offer may be transmitted to the other terminal through an IP multimedia subsystem (IMS) in the case of a network guaranteeing the quality, such as the LTE, the 5G, etc.

The terminal device 1100 according to an embodiment may receive the SDP offer, examine picture processing capacities of picture compressors mounted in the terminal device 100, a service policy, a bit rate, a size of a picture, a resolution of a picture, etc. to write an SDP answer, and then transmit the SDP answer to the remote control device 2000 (S320). The SDP answer may include the information about the video parameter required for the transmission of the packed picture.

When the remote control device 2000 receiving the SDP answer accepts the SDP answer, based on the mutual approval, a picture compressed by the terminal device 1100 may be transmitted from the terminal device 1100 to the remote control device 2000. For example, a vehicle may perform a mutual negotiation with a remote control system and based on a result of the negotiation, may transmit a packed picture to the remote control system. The remote control system may transmit a control signal for controlling the vehicle, based on the packed picture received from the vehicle.

When a change in a compression condition and/or a transmission condition of a picture is required, the remote control device 2000 according to an embodiment may transmit an SIP UPDATE message to the terminal device 1100 to perform a mutual negotiation again (S330).

The terminal device 1100 according to an embodiment may receive the SDP UPDATE message, examine picture processing capacities of picture compressors mounted in the terminal device 100, a service policy, a bit rate, a size of a picture, etc. to write a second SDP answer, and then transmit the second SDP answer to the remote control device 2000 (S340).

When the remote control device 2000 receiving the second SDP answer accepts the second SDP answer, the remote control device 2000 may transmit an Ack message to the terminal device 1100 (S350). Based on mutual confirmation, a picture compressed by the terminal device 1100 may be transmitted from the terminal device 1100 to the remote control device 2000 (S360).

However, embodiments are not limited to the description with reference to FIG. 3. The terminal device 1100 may initially transmit an SDP offer to the remote control device 2000 to start a negotiation for the transmission condition.

Figure 4:
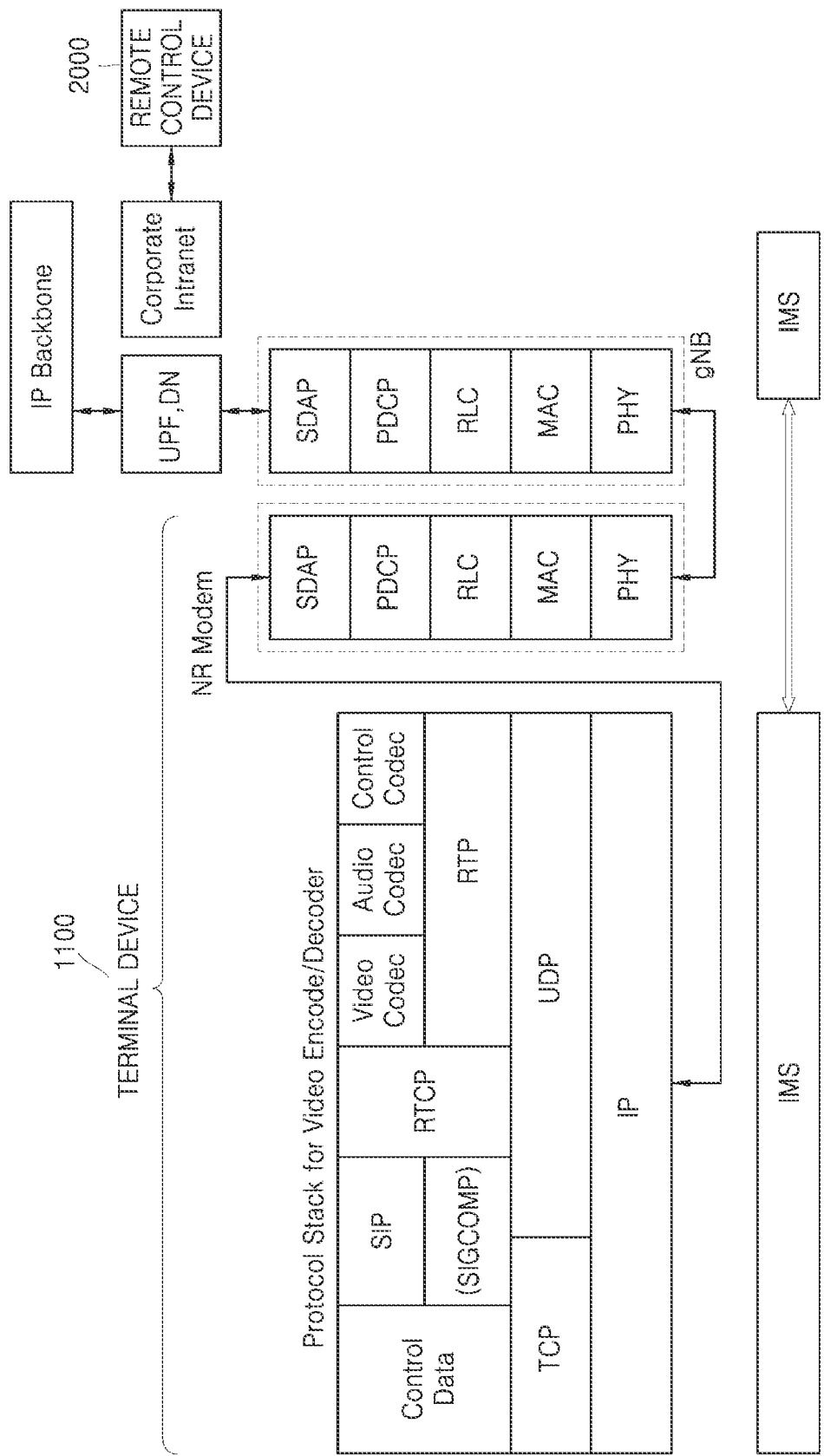
FIG. 4 illustrates an example of a general protocol structure of a picture communication system according to an embodiment.

FIG. 4 illustrates an example a general protocol structure of a picture communication system according to an embodiment. FIG. 4 illustrates an example a general protocol structure of a picture communication system according to an embodiment. For example, in FIG. 4, the terminal device 1100 may be an electronic device mounted in an autonomous driving vehicle, and the remote control device 2000 may be an electronic device remotely controlling the autonomous driving vehicle.

A 5G communication framework may be used by a picture communication system according to an embodiment. An NR modem illustrated in FIG. 4 may support the 5G communication method. A packet data convergence protocol (PDCP), radio link control (RLC), media access control (MAC), physical layer (PHY), etc. may be communication protocols included in the NR modem of a terminal and a base station. A UPF, a DN, etc. are nodes included in a core network.

In FIG. 4, an order of a process in which the communicator 1130 of the terminal device 1100 transmits a packed picture corresponds to an order of SDAP→PDCP→RLC→MAC→PHY, and an order of a process in which the communicator 2010 of the remote control device 2000 receives the packed picture corresponds to an order opposite thereto.

An IP multimedia subsystem (IMS) may include procedures for negotiation of a picture transmission condition including packing structure information. The picture communication system according to an embodiment may negotiate the packing structure information through the IMS. The picture communication system according to an embodiment may set quality of service (QoS) of a transmission path and obtain required radio resources through the IMS before directly performing picture communication (for example, before the remote control device receives a packed picture from the vehicle and remotely controls the vehicle based on the received packed picture).

Video and audio for identifying a road condition may be transmitted from the terminal device 1100 to the remote control device 2000 through an uplink, and control data for controlling the vehicle may be transmitted from the remote control device 2000 to the terminal device 1100 through a downlink. According to required latency and integrity, the control data may be transmitted through TCP, (RTP)/UDP.

As illustrated in FIG. 4, compared to the 4G method, in the 5G method, a service data adaptation protocol (SDAP) may be added on the topmost end of a UP protocol stack, and nodes, such as a serving gateway (S-GW), a packet data network gateway (P-GW), etc., may be replaced by a UPF and a DN. In a section between an IP backbone and the remote control device 2000, a packet loss rate may be regarded as 0 and a delay may be regarded as a very little fixed value.

In the picture communication system transmitting and receiving pictures about surrounding environments of a vehicle, when the surrounding environments of the vehicle are complicated or contain many motions, the pictures transmitted in compressed forms may have degraded picture quality. When the received pictures have degraded picture quality, the remote control device may have difficulty controlling the vehicle. Thus, there is a requirement for a mechanism, in which the terminal device mounted in the vehicle may continually inspect a quality coordinate, such as a signal-to-noise ratio (SNR) and/or a peak signal-to-noise ratio (PSNR) of a picture transmitted, and when the quality of the picture drops below a target level, the terminal device may request an increase of a bit rate from a network.

Figure 5:
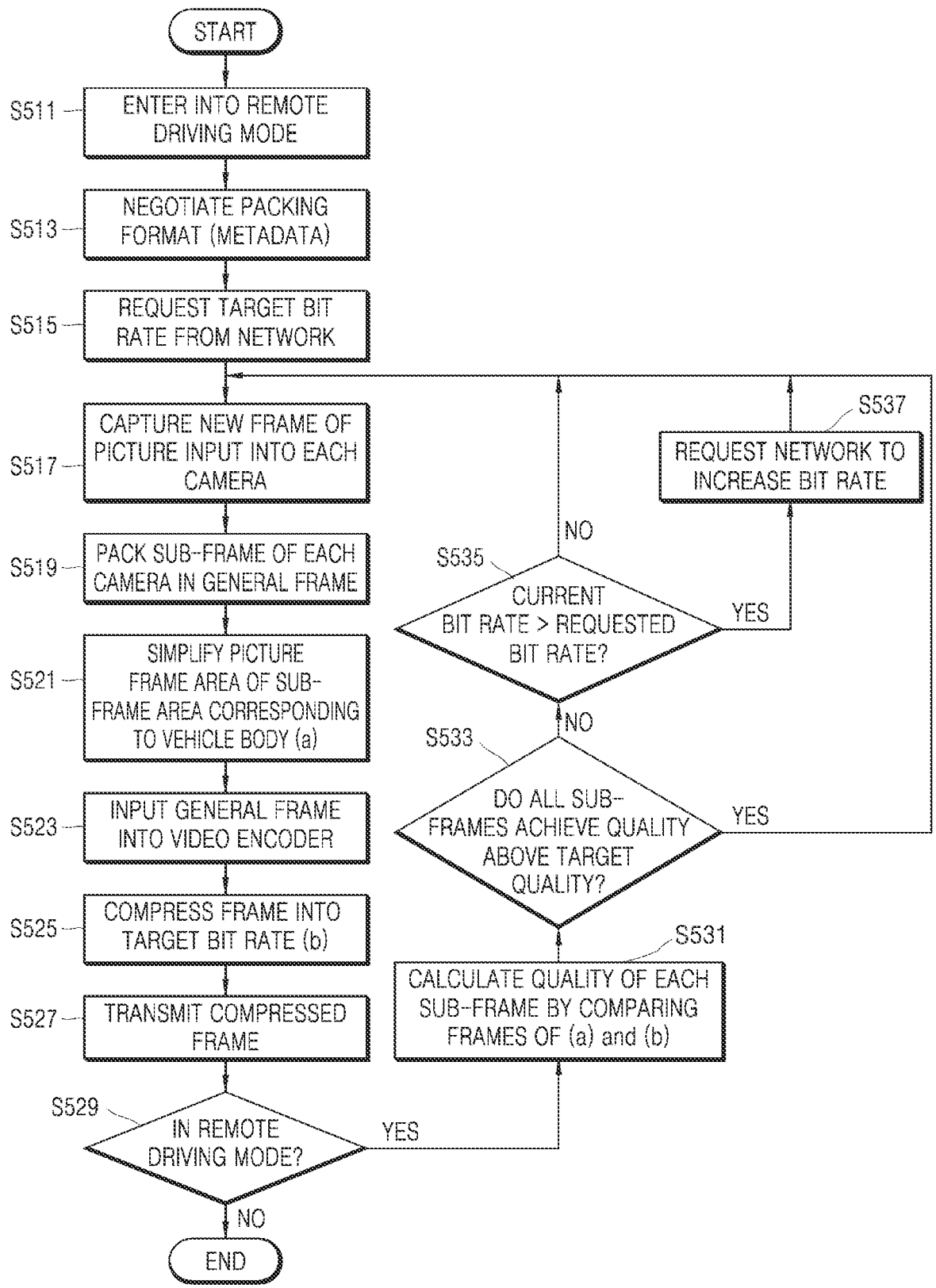
FIG. 5 is a flowchart of a method, performed by a terminal device, of transmitting a picture by adjusting a bit rate according to a condition of a network, according to an embodiment.

FIG. 5 is a flowchart of a method, performed by a terminal device, of transmitting a picture by adjusting a bit rate according to a condition of a network, according to an embodiment.

In operation S511, the terminal device 1100 according to an embodiment may identify that the vehicle in which the terminal device 1100 is mounted operates in a remote driving mode in which the vehicle is controlled by the remote control device 2000.

In operation S513, the terminal device 1100 according to an embodiment may negotiate a format in which a packed picture is to be transmitted with the remote control device 2000. Information about the format in which the packed picture is to be transmitted may be included in metadata. In operation S515, the terminal device 1100 according to an embodiment may request and receive information about a target bit rate. The target bit rate may denote a maximum bit rate assigned to a transmission of a packed picture from the terminal device 1100 to the remote control device 2000. Operations S513 and S515 may be performed as one operation in which data is transmitted and received through an SDP of a control plane.

FIG. 6 is a diagram of an example in which a picture communication system negotiates a picture transmission condition, according to an embodiment. When the picture communication system negotiates the picture transmission condition, the terminal device 1100 and the remote control device 2000 may exchange an SIP message. The picture transmission condition may be negotiated by using an SDP that is a protocol describing media-related information in the SIP message.

FIG. 6 illustrates an example of an SDP message exchanged between the terminal device 1100 and the remote control device 2000. Referring to an SDP offer 610 of FIG. 6, the remote control device 2000 may suggest to the terminal device 1100 that a packed picture compressed in 4K may be transmitted and received at 20 Mbps. Referring to an SDP answer 630, the terminal device 1100 may answer that the terminal device 1100 may transmit a packed picture at 15 Mbps.

In the SDP message, an attribute of a=subpicture may be defined, and locations and resolutions of sub-frames in a general frame may be described. fl may denote a front-left picture of the vehicle, fr may denote a front-right picture of the vehicle, sl may denote a left-side picture of the vehicle, sr may denote a right-side picture of the vehicle, and cr may denote a central picture of the vehicle.

For example, [fl, 11, 11, 1290, 730] may indicate that a resolution of the front-left picture of the vehicle is 1280× 720. Referring to FIG. 6, a resolution of the front-left picture fl of the vehicle and the front-right picture fr of the vehicle is negotiated as 1280×720, and a resolution of the left-side picture sl of the vehicle, the right-side picture sr of the vehicle, and the central picture cr of the vehicle is negotiated as 640×480.

Referring to FIG. 5 again, in operation S517, the terminal device 1100 according to an embodiment may capture a new picture frame input into each of a plurality of cameras mounted in the vehicle. In operation S519, the terminal device 1100 according to an embodiment may generate a packed picture by packing the picture frame of each camera as a sub-frame of the general frame (or whole frame) of the packed picture.

In operation S521, the terminal device 1100 according to an embodiment may simplify picture information of an area corresponding to a vehicle body in the sub-frame captured by each camera. According to a location and a direction of a camera mounted in the vehicle, the camera may capture a portion of the vehicle body together with a surrounding environment of the vehicle. For autonomous driving or remote driving of the vehicle, the picture capturing the vehicle body may have relatively less important information than a picture capturing the surrounding environment. Thus, the terminal device 1100 according to an embodiment may simplify the picture information of the area corresponding to the vehicle body in the sub-frame captured by each camera.

In operation S523, the terminal device 1100 according to an embodiment may encode the general frame of the packed picture via a video encoder. In operation S525, the terminal device 1100 according to an embodiment may compress the encoded general frame into a target bit rate. In operation S527, the terminal device 1100 according to an embodiment may transmit the compressed frame to the remote control device 2000.

In operation S529, the terminal device 1100 according to an embodiment may identify once more whether the vehicle in which the terminal device 1100 is mounted operates in a remote driving mode. When the vehicle continually operates in the remote driving mode, the terminal device 1100 may have to continually transmit the packed picture to the remote control device 2000. In operation S531, the terminal device 1100 according to an embodiment may calculate quality of each sub-frame by comparing a frame (b) compressed in operation S525 with a frame (a) before compression. In operation S533, the terminal device 1100 according to an embodiment may determine whether all sub-frames have quality above target quality.

When all sub-frames included in the compressed frame have the quality above the target quality, the terminal device 1100 may return to operation S517 and capture a new picture frame. When at least one of the sub-frames included in the compressed frame does not have the quality above the target quality, the terminal device 1100 according to an embodiment may determine in operation S535 whether or not a current bit rate required for transmitting the compressed frame in operation S527 is greater than the target bit rate requested in operation S515.

In operation S537, when the current bit is greater than the target bit rate, the terminal device 1100 may request the network to increase the bit rate. For example, the terminal device 1100 may request an increase of the target bit rate set for each sub-frame or an increase of the target bit rate set for the general frame. A sub-frame may be referred to as a projected picture, and a general frame may be referred to as a packed picture. When the current bit rate is not greater than the target bit rate, the terminal device 1100 may return to operation S517 and may capture a new picture frame.

FIG. 5 illustrates that only the terminal device 1100 requests the remote control device 2000 to increase the bit rate. However, embodiments are not limited thereto. For example, the remote control device 200 may request the terminal device 1100 to increase the bit rate of a picture that is transmitted.

When negotiating the picture transmission condition, the terminal device 1100 according to an embodiment may at least one of size information of the vehicle in which the terminal device 1100 is mounted, location information of the camera mounted in the vehicle, and direction information of the camera, to the remote control device 2000.

FIGS. 7 through 10 are diagrams for describing vehicle size information, camera location information, and camera direction information transmitted by a terminal device to a remote control device, according to an embodiment.

Figure 7:
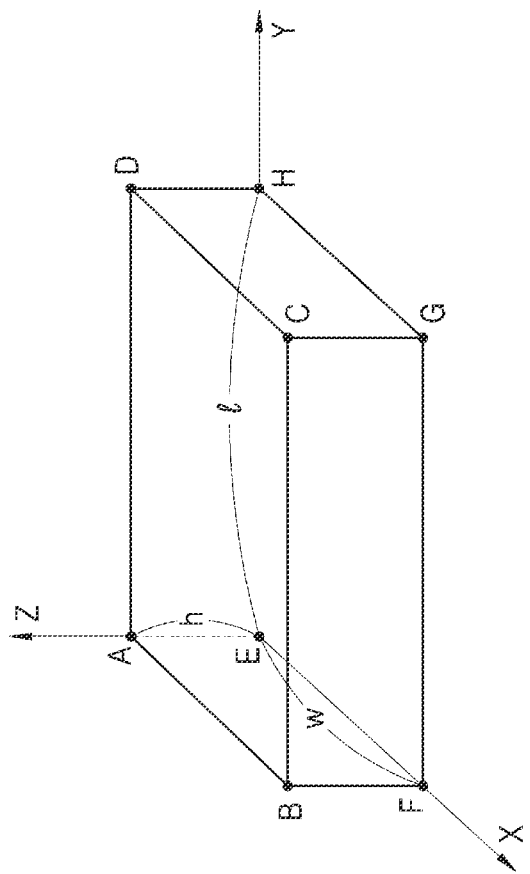
FIGS. 7 through 10 are diagrams for describing vehicle size information, camera location information, and camera direction information transmitted by a terminal device to a remote control device, according to an embodiment.

A cuboid ABCDEFGH of FIG. 7 may indicate a vehicle having a width w, a length l, and a height h. The size information of the vehicle may be indicated by a coordinate value on a three-dimensional space or may be indicated by a width, a length, and a height of the vehicle. For example, the size information of the vehicle may be indicated by a coordinate value of at least one of the points A, B, C, D, E, F, G, and H of FIG. 7. Alternatively, the size information of the vehicle may be indicated by a vector including at least one of the width, the length, and the height of the vehicle. In FIG. 7, a rectangle CDGH may indicate a front side of the vehicle and a rectangle ABFE may indicate a rear side of the vehicle.

FIG. 7 illustrates an example of transmitting the size information of the vehicle by simplifying the vehicle as having a rectangular shape. However, embodiments of the disclosure are not limited thereto. The size information of vehicles having various shapes may be indicated by using the coordinate values of various points on a three-dimensional space.

Figure 8:
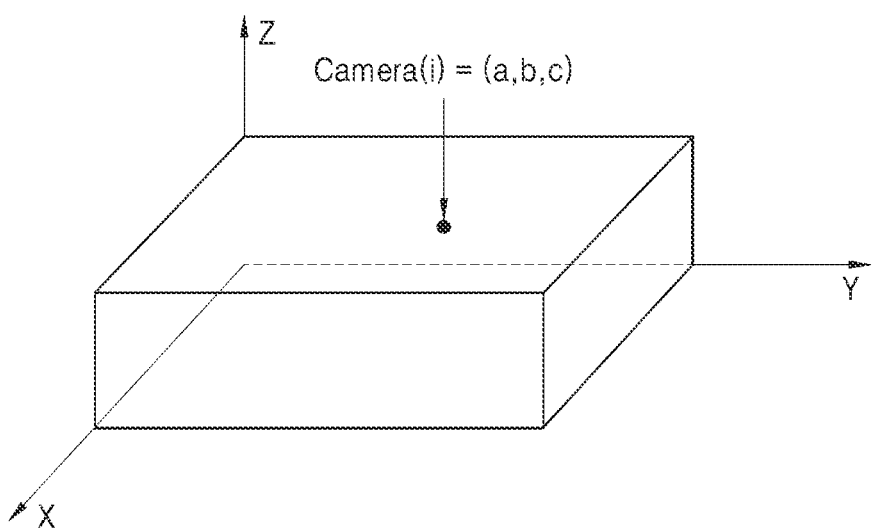

In addition, the terminal device 1100 according to an embodiment may indicate a location of the camera by using a coordinate value as illustrated in FIG. 8 and transmit the coordinate value to the remote control device 2000. The location of an $i^{th}$ camera Camera (i) may indicate a relative location of the camera in the vehicle. The terminal device 1100 may transmit a point (a, b, c) in the three-dimensional space that is set based on the size of the vehicle to the remote control device 2000 as the location information of the camera.

Also, the terminal device 1100 according to an embodiment may transmit the direction information of the camera to the remote control device 2000. The direction information of the camera may be indicated by a vector value based on the location of the camera.

Figure 9:
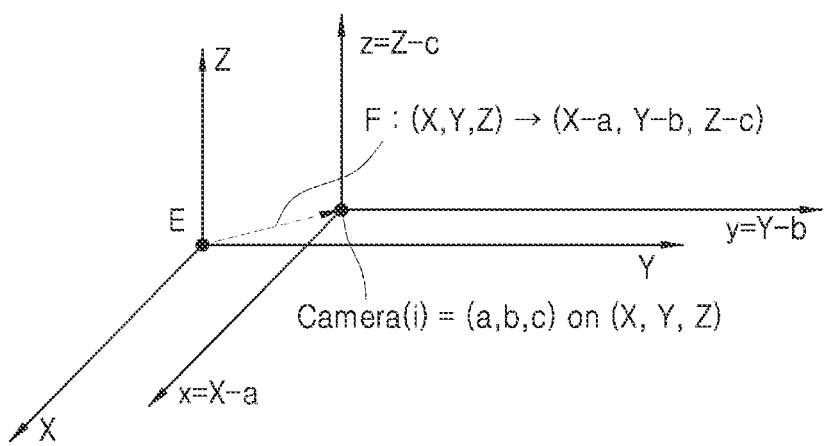
Figure 10:
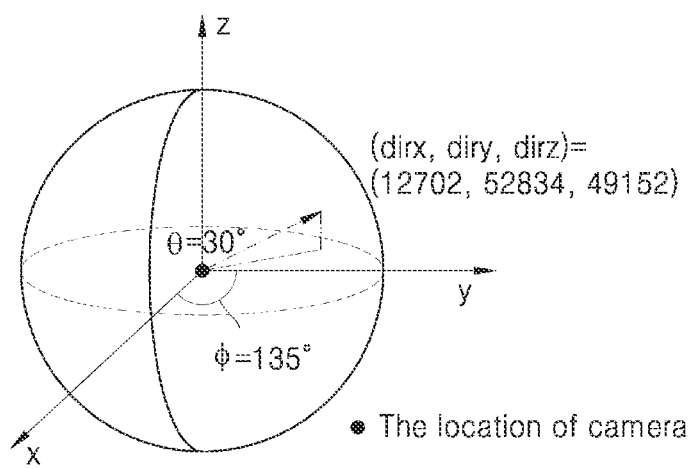

As illustrated in FIGS. 9 and 10, a three-dimensional space generated from the size information of the vehicle (for example, the width, the length, and the height of the vehicle) may be linearly shifted to a three-dimensional space having the location (a, b, c) of the $i^{th}$ camera Camera (i) as a starting point. The direction information of the camera may be indicated on the three-dimensional space having the location (a, b, c) of the $i^{th}$ camera Camera (i) as the starting point.

When the remote control device 2000 is to change the direction of the camera, the remote control device 2000 may request the change of the direction through a negotiation via a control plane. The terminal device 1100 may correct the direction of the camera or may control the vehicle to change the direction of the camera, based on the request for the change received from the remote control device 2000. The terminal device 1100 may transmit a picture captured by the camera, the direction of which is changed.

[Table 1] below indicates mV2X control plane negotiation info syntax used for negotiation of a picture transmission condition. The terminal device 1100 according to an embodiment may transmit at least one parameter included in [Table 1] to the remote control device 2000 through an SDP in an SIP message.

TABLE 1 mV2X Control Plane Negotiation Info Syntax

VINstring
VehicleSize
VehicleHeight
Position3D
CameraNumber
PackedPictureResolution
PackedPictureFrameRate
For (i=0; i<CameraNumber; i++) {
    CameraLocation(i)
    CameraLocationVirtualID(i)
    CameraOrientation(i)
    PictureResolution(i)
    PictureFrameRate(i)
}

Hereinafter, the semantics of each syntax element included in [Table 1] is described.

VINstring is a field composed of first through seventeenth OCTET strings to provide identification (ID) of the vehicle via a legal vehicle identification number (VIN) or a value shorter than the VIN.

VehicleSize is a field composed of 3 bytes (24 bits) providing VehicleWidth (MSB 10 bits) and VehicleLength (LSB 14 bits). Integer values of VehicleWidth and VehicleLength respectively indicate a width (0 to 1023 cm) and a length (0 to 16383 cm) of the vehicle in units of 1 centimeter (cm).

VehicleHeieght is a field composed of 7 bits providing a height of the vehicle. Integer values (0 to 127) of this field have to indicate the height of the vehicle in units of 5 cm. Thus, this field may indicate a range up to 6.35 m.

As illustrated in FIG. 7, the three-dimensional space having the point E of the cuboid generated based on the width w, the length l, and the height h of the vehicle as the starting point may be set. For example, the point E may correspond to a left end, a rear end, and a bottom end of the vehicle. The point A may have a coordinate value (0, 0, h), the point F may have a coordinate value (w, 0, 0), and the point H may have a coordinate value (0, 1, 0), and in FIG. 7, the rectangle CDHG may indicate a front side of the vehicle and the rectangle ABFE may indicate a rear side of the vehicle.

Position 3D in [Table 1] is a field composed of 10 bytes providing a latitude (first 4 bytes), a longitude (middle 4 bytes), and an elevation (last 2 bytes) of the vehicle when the negotiation information is transmitted.

Latitude (32 bits) indicates a geographical latitude of the vehicle. The latitude may be a value of 32 bits, may be indicated by a ⅒th integer micro degrees, and may provide a range of plus and minus 90 degrees (that is, −900000000 to 900000001) based on horizontal datum in use. The value of 900000001 may have to be used for representing that it is unavailable. MSB of this field may have to indicate a sign of a number. To set the MSB as 0 may be about a positive number (that is, a plus value) or positive 0, and to set the MSB as 1 may be about a negative number or negative 0.

Longitude (32 bits) is a field indicating a geographical longitude of the vehicle. The longitude may be a value of 32 bits, may be indicated by a $1/10^{th}$ integer micro degrees, and may provide a range of plus and minus 180 degrees (that is, −1799999999 to 1800000001) based on horizontal datum in use. The value of 1800000001 may have to be used for representing that it is unavailable. MSB of this field may have to indicate a sign of a number. To set the MSB as 0 may be about a positive number (that is, a plus value) or positive 0, and to set the MSB as 1 may be about a negative number or negative 0.

Elevation (16 bits) is a field indicating a geographical location of the vehicle above or below a reference oval (generally WSG-84). The number of 16 bits has a resolution of 1 decimeter and indicates an asymmetrical range of a positive value and a negative value. This field may be encoded as below.

A range between 0x0000 and 0xEFFF (decimal numbers from 0 to 61439) corresponds to positive numbers indicating an altitude (that is, above the reference oval) between 0 and +6143.9 meters. A range between 0xF001 and 0xEFFF corresponds to negative numbers indicating an altitude (that is, below the reference oval) between −409.5 and −0.1 meters. An altitude greater than +6143.9 meters is indicated by 0xEFFF. An altitude less than −409.5 meters is indicated by 0xF001. When a transmission device does not know the altitude of a receiving device, the altitude data element may have to be encoded as 0xF000.

For example, an altitude of 0 meters may be encoded as 0x0000 and an altitude of −0.1 meters may be encoded as 0xFFFF. An altitude of +100.0 meters may be encoded as 0x03E8.

CameraNumber is a field composed of 5 bits and providing the maximum number (1 to 32) of projected pictures included in a packed picture. The maximum number of cameras mounted in the vehicle and used to generate the packed picture may be indicated. When the maximum number of projected pictures in the packed picture is N (1 to 32), CameraNumber may have to be set as N−1 (0 to 31).

PackedPictureResolution is a field composed of 4 bytes providing a luma width and a luma height of a picture. First 2 bytes of the PackedPictureResolution field indicate the luma width of the packed picture and last 2 bytes indicate the luma height of the packed picture.

PackedPictureFrameRate is a field composed of 8 bytes providing a frame rate of the packed picture. First 4 bytes of the PackedPictureFrameRate field (PackedPictureNumUnitsinTick) indicate the number of time units of a clock operating at the frequency PackedPictureTimeScale Hz corresponding to one increase value (referred to as one clock tick) of a clock tick counter. The value has to be greater than 0. A clock tick in a unit of a second equals a value generated by dividing PackedPictureNumUnitsInTick by PackedPictureTimeScale. For example, when a packed picture rate of a video signal is 25 Hz, PackedPictureTimeScale may be 27000 000, and PackedPictureNUmUnitsinTick may equal 1080000, and thus, the clock tick may be 0.04 seconds.

Last 4 bytes of PackedPictureFrameRate indicate the number of time units transmitted during a second. For example, PackedPictureTimeScale of a time coordinate system measuring time by using a 27 MHz clock is 27000000. The value of PackedPictureTimeScale has to be greater than 0.

CameraLocation (i) is a field composed of 31 bits for providing a three-dimensional location of the camera (i) on a three-dimensional space generated by mapping a width, a length, and a height of the vehicle respectively on an x axis, a y axis, and a z axis. The three-dimensional location is indicated by x, y, and z components on the three-dimensional space. The CameraLocation (i) field is composed of LocationX (an x component, first 10 bits), LocationY (a y component, middle 14 bits), and LocationZ (a z component, last 7 bits).

LocationX (the first 10 bits) may indicate a value of the x component of the camera (i) on the three-dimensional space and provide a range of 0 to 1023 cm in units of 1 cm.

LocationY (the middle 14 bits) may indicate a value of the y component of the camera (i) on the three-dimensional space and provide a range of 0 to 16383 cm in units of 1 cm.

LocationZ (the last 7 bits) may indicate a value of the z component of the camera (i) on the three-dimensional space and provide a range up to 65 cm in units of 5 cm.

Referring to FIG. 8, LocationX, LocationY, and LocationZ of CameraLocation (i), the location of Camera(i), may respectively indicate a, b, and c.

CameraLocationVirtualID (i) is a field composed of 5 bits for providing virtual ID with respect to CameraLocation (i). CameraLocationVirtualID (i) may have to be set as i.

CameraOrientation (i) is a field composed of 12 bytes for providing x, y, and z components in a three-dimensional view direction of Camera (i). In order to calculate the x, y, and z components in the three-dimensional view direction of Camera (i), the three-dimensional space indicated in FIG. 7 may be linearly shifted to a three-dimensional space with respect to the view direction of Camera (i) based on function F: (X, Y, Z)->(x=X−LocationX, y=Y−LocationY, z=Z−LocationZ). As a result of the linear shift, the location of Camera (i) may become the starting point of the three-dimensional space (x, y, z). For example, as illustrated in FIG. 9, in the case of Camera (i)=(a, b, c), the three-dimensional space may be linearly shifted by the function F: (X, Y, Z)->(x=X−a, y=Y−b, z=Z−c).

DirX (first 4 bytes), DirY (middle 4 bytes), and DirZ (last 4 bytes) of CameraOrientation (i) may respectively define x, y, and z components in a unit vector of the three-dimensional view direction in an orthogonal coordinate system in which (x, y, z) corresponding to a sphere location in which ($\varphi$, $\theta$) is (0, 0) is (1, 0, 0). For example, when a direction of the camera is indicated by (1, 0, $\varphi$) in a spherical coordinate system, x, y, and z components of the direction of the camera in the orthogonal coordinate system may be $\sin \theta \cos \varphi$, $\sin \theta \sin \varphi$, $\cos \theta$. Values of DirX, DirY, and DirZ may have to be within a range of 1 to 65535, wherein 1 corresponds to −1, 32768 corresponds to 0, and 65535 corresponds to +1.

The DirX, DirY, and DirZ field may be calculated based on an azimuth p and an altitude $\theta$. Here, the view direction indicates a three-dimensional vector indicating a location of a spherical surface from the center of a sphere.

For example, as illustrated in FIG. 10, the x, y, z components of the view direction of Camera (i), in which an azimuth $\varphi d$ and an altitude $\theta d$ are (135°, 30°), may be set to be the same as 12702, 52834, and 49152, respectively. DirX, DirY, and DirZ may be calculated according to the following equation [Equation 1] based on the azimuth $\varphi d$ and the altitude $\theta d$.

$$\phi = \phi_d * \pi \div 180 \qquad \text{[Equation 10]}$$

$$\theta = \theta_d * \pi \div 180$$

$$dirx = 32768 + \cos(\phi) * \cos(\theta) * 2^{16}/2 =$$

$$32768 + (-0.7071) * 0.866 * 32768 = 12702$$

-continued
$$diry = 32768 + \operatorname{Sin}(\phi) * \operatorname{Cos}(\theta) * 2^{16}/2 =$$
$$32768 + 0.7071 * 0.866 * 32768 = 52834$$
$$dirz = 32768 + \operatorname{Sin}(\theta) * 2^{16}/2 = 32768 + 0.5 * 32768 = 49152$$

PictureResolution (i) is a field composed of 4 bytes providing a luma width and a luma height of a picture received from Camera (i). First 2 bytes indicate the luma width of the picture received from Camera (i), and last 2 bytes indicate the luma height of the picture received from Camera (i).

PictureFrameRate (i) is a field composed of 8 bytes providing a frame rate of the picture received from Camera (i).

First 4 bytes of PictureFrameRate (i) (PictureNumUnitsInTick (i)) indicate the number of time units of a clock operating at the frequency PictureTimeScale (i) Hz corresponding to one increase value (referred to as a clock tick) of a clock tick counter. The value may have to be greater than 0. A clock tick in a unit of a second equals a value generated by dividing PictureNumUnitsInTick (i) by PictureTimeScale (i).

Last 4 bytes of PictureFrameRate (i) indicate the number of time units transmitted during a second. For example, a time coordinate system measuring time by using a 27 MHz clock has PictureTimeScale (i) of 27000000. The value of PictureTimeScale (i) may have to be greater than 0.

As described above, the picture communication system according to an embodiment may negotiate information, such as a size of the vehicle, a location of the camera, a direction of the camera, and a limit resolution of pictures included in a packed picture, through the control plane. Based on a result of the negotiation, the picture communication system according to an embodiment may transmit and receive the packed picture in which the plurality of input pictures are combined through the user plane.

Thus, according to embodiments, the picture communication system may transmit and receive the input pictures by packing the input pictures in one packed picture, regardless of the number of input pictures, and thus, may maximize the amount of information that a user receives. In order to transmit a plurality of input pictures without packing, one video encoder may have to sequentially compress and transmit the input pictures, or a plurality of encoders may have to simultaneously compress and transmit the input pictures. Thus, when the terminal device transmits the plurality of input pictures without packing, a transmission latency may occur, or a degree of complexity of a transmitter and a receiver may be increased based on the number of input pictures.

However, according to the embodiments, the picture communication system may reduce the degree of complexity of the transmitter and the receiver, regardless of the number of input pictures. Hereinafter, an operation of the terminal device 1100 included in the picture communication system according to an embodiment is described in detail.

Figure 11:
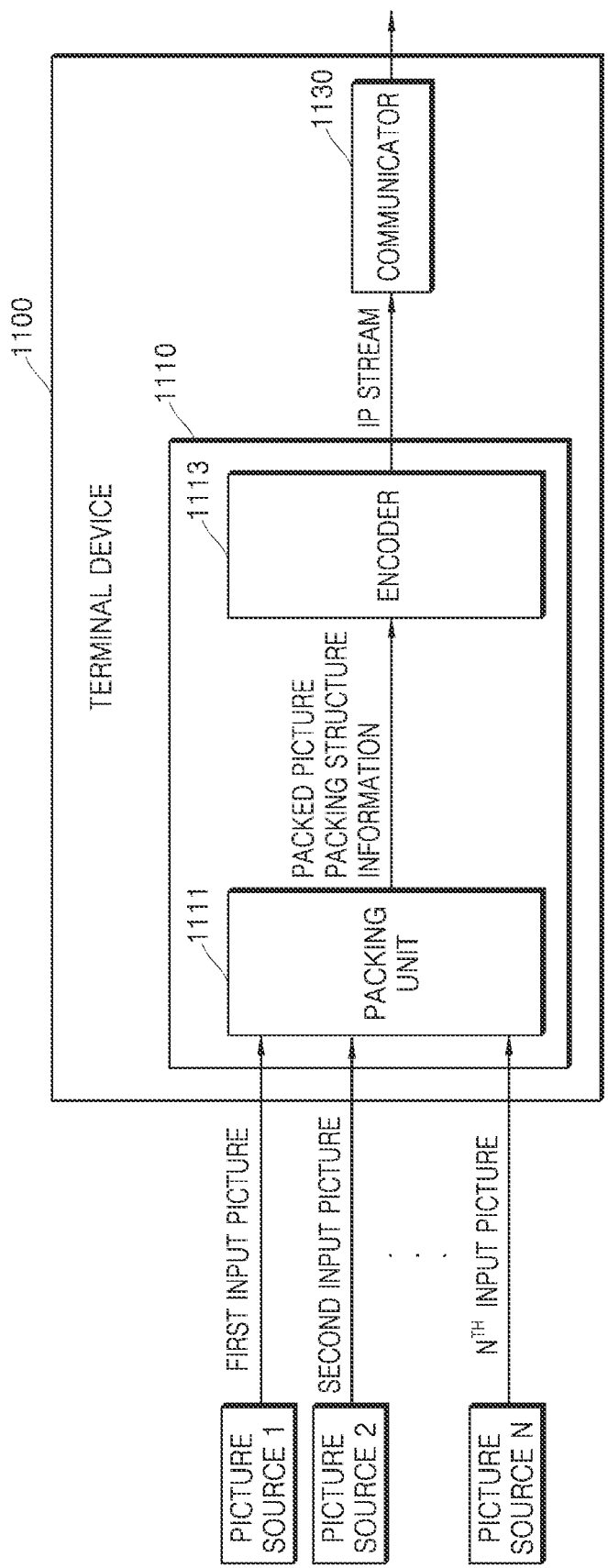
FIG. 11 illustrates a structure of a terminal device according to an embodiment.

FIG. 11 illustrates a structure of the terminal device 1100 mounted in a vehicle, according to an embodiment.

The terminal device 1100 according to an embodiment may include the processor 1110 configured to obtain a plurality of input pictures and output an IP stream and the communicator 1130.

The processor 1110 according to an embodiment may control general operations of the terminal device 1100. For example, the processor 1110 may control the communicator 1130. FIG. 11 illustrates that the terminal device 1100 includes one processor 1110. However, embodiments are not limited thereto, and the terminal device 1100 may include the processor 1110 in a multiple number. Also, the processor 1110 may negotiate a picture transmission condition with a processor of the remote control device 2000 through the communicator 1130.

The communicator 1130 according to an embodiment may exchange data with the remote control device 2000 for controlling driving of the vehicle. When the communicator 1130 according to an embodiment negotiates the picture transmission condition, the communicator 1130 may transmit at least one of size information of the vehicle in which the terminal device 1100 is mounted, location information of a camera mounted in the vehicle, and direction information of the camera, to the remote control device 2000.

In detail, the communicator 1130 may transmit location information of a plurality of cameras mounted in the vehicle to the remote control device 2000. The location information of the cameras may be indicated as an X-axis value, a Y-axis value, and a Z-axis value on a three-dimensional space set based on a size of the vehicle. Also, the communicator 1130 may transmit at least one of the size information of the vehicle and the direction information of the plurality of cameras, along with the location information of the plurality of cameras.

The terminal device 1100 according to an embodiment may receive a control signal from the remote control device 2000 and may change a direction of at least one of the plurality of cameras based on the received control signal. When the direction of the camera is changed, the communicator 1130 may transmit information about the changed direction to the remote control device 2000.

The processor 1110 according to an embodiment may obtain a plurality of input pictures from a plurality of picture sources and combine the plurality of input pictures based on a packing structure to generate a packed picture. Alternatively, the processor 1110 according to an embodiment may generate a plurality of input pictures from data received from the outside or stored inside the processor 1110. The terminal device 1100 according to an embodiment may include picture sources and generate a plurality of input pictures. For example, in an autonomous driving system, the terminal device 1100 according to an embodiment ma receive a picture captured by the camera mounted in the vehicle and transmit the received picture to the processor 1110.

The processor 1110 according to an embodiment may generate a bitstream including packing structure information and a packed picture. As illustrated in FIG. 11, the processor 1110 according to an embodiment may include a packing unit 1111 and an encoder 1113. The packing unit 1111 and the encoder 1113 illustrated in FIG. 4 may be hardware components or functional blocks realized by the processor 1110. Thus, operations of the packing unit 1111 and the encoder 1113 described hereinafter may be performed by the processor 1110.

The packing unit 1111 according to an embodiment may obtain a plurality of input pictures and combine the plurality of input pictures based on a packing structure to generate a packed picture. FIG. 11 illustrates an example in which N input pictures are received.

The packing unit 1111 according to an embodiment may generate a plurality of projected pictures, by adjusting a size of at least one of the plurality of input pictures or rotating at least one of the plurality of input pictures based on the packing structure, and may combine the plurality of projected pictures to generate the packed picture. The packing unit 1111 may generate the packed picture by combining the plurality of projected pictures based on the packing structure. The packing unit 1111 may generate the packed picture by arranging each projected picture in each location of the packed picture that is determined based on the packing structure.

The processor 1110 according to an embodiment may determine the packing structure based on a driving state of a vehicle. The processor 1110 may receive a control signal for controlling driving of the vehicle from the remote control device 2000 through the communicator 1130. The processor 1110 may determine the driving state of the vehicle based on the received control signal. Alternatively, the processor 1110 may determine the driving state of the vehicle based on a signal received from a sensor mounted in the vehicle. Alternatively, the processor 1110 according to an embodiment may determine the packing structure based on packing structure information received, through the communicator 1130, from the remote control device 2000.

For example, the processor 1110 according to an embodiment may determine the packing structure according to a driving direction of the vehicle. The processor 1110 may determine the packing structure such that a picture corresponding to the driving direction of the vehicle is included in the packed picture to have a greater size than other pictures (or such that a resolution of a picture corresponding to the driving direction of the vehicle is greater than a resolution of other pictures). For example, when the vehicle moves forward, the processor 1110 may determine the packing structure such that a picture indicating a front environment of the vehicle is included in the packed picture to have a greater size than other pictures.

The packing unit 1111 may generate packing structure information. The packing structure information according to an embodiment may include at least one of information about a device configured to capture a plurality of input pictures, information about a feature of the packed picture, and information indicating features of projected pictures included in the packed picture. The information indicating features of projected pictures included in the packed picture according to an embodiment may include at least one of information about a size of at least one of the plurality of projected pictures included in the packed picture, information about a location of the projected picture in the packed picture, and information about whether or not the projected picture corresponds to a picture generated by rotating the input picture.

The packing unit 1111 may generate the packed picture and the packing structure information and may output the generated packed picture and packing structure information to the encoder 1113.

The encoder 1113 according to an embodiment may encode the packed picture. The encoder 1113 may generate a bitstream including the packing structure information and the encoded packed picture. For example, the encoder 1113 according to an embodiment may generate an SEI message including the packing structure information and generate a bitstream composed of NAL units including the encoded packed picture and the SEI message. The encoder 1113 may generate and output an IP stream including the bitstream.

The communicator 1130 according to an embodiment may transmit the IP stream including the bitstream. The communicator 1130 may transmit the IP stream to the remote control device 2000. The communicator 1130 according to an embodiment may support various communication methods. For example, the communicator 1130 may support various communication methods, such as 4G (or LTE), 5G (or NR), Wi-Fi, etc. The communicator 1130 may transmit the IP stream to the remote control device 2000 through the process illustrated in FIG. 4.

Figure 12:
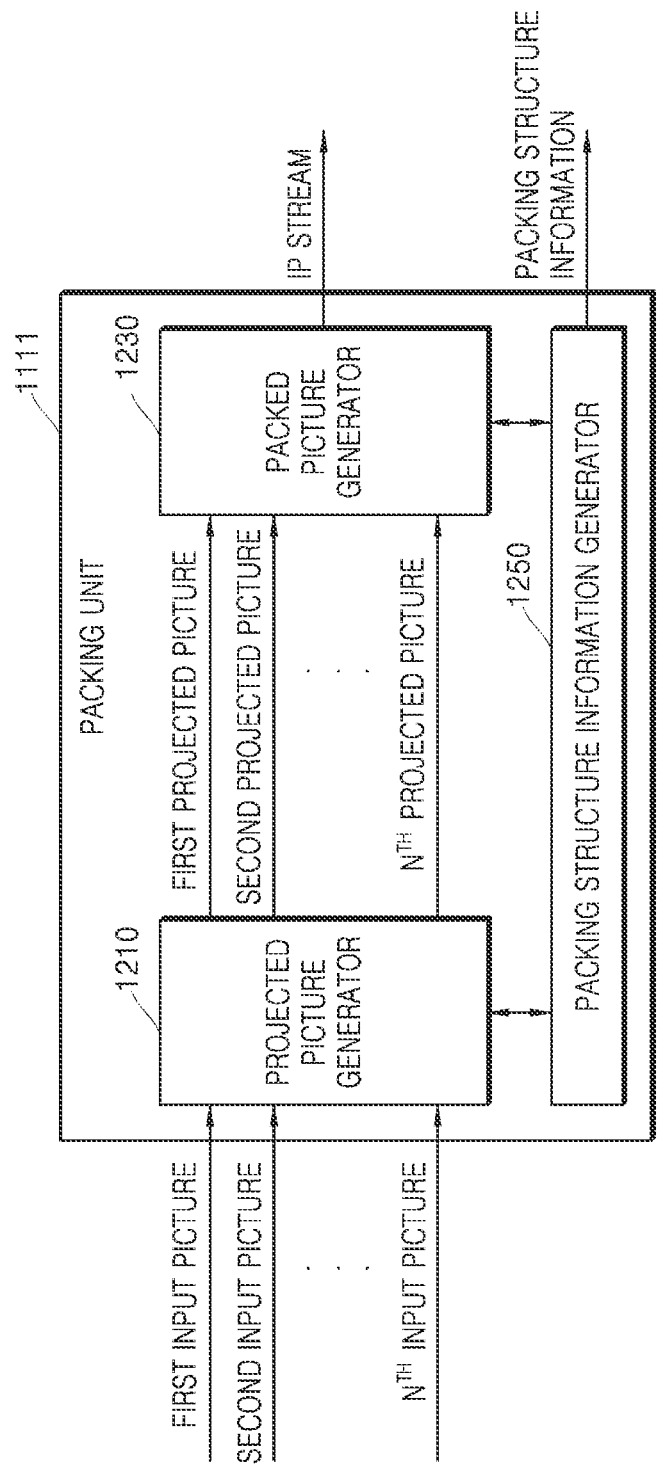
FIG. 12 illustrates a structure of a packing unit according to an embodiment.

FIG. 12 illustrates a structure of a packing unit according to an embodiment.

As illustrated in FIG. 12, the packing unit 1111 according to an embodiment may receive a plurality of input pictures from a plurality of cameras and generate and output a packed picture and packing structure information. The packing unit 1111 according to an embodiment may include a projected picture generator 1210, a packed picture generator 1230, and a packing structure information generator 1250.

The projected picture generator 1210 according to an embodiment may generate and output projected pictures from the input pictures, based on the packing structure information. The projected picture generator 1210 may generate the plurality of projected pictures by adjusting a size of each input picture or rotating each input picture based on the packing structure.

The packed picture generator 1230 according to an embodiment may generate and output the packed picture by combining the projected pictures based on the packing structure information. The packing structure information generator 1250 according to an embodiment may generate the information about the packing structure including a video parameter, etc. of the packed picture.

Hereinafter, the packing structure information generated by the packing structure information generator 1250 according to an embodiment is described in detail.

TABLE 2

| nal_unit_type | Name of nal_unit_type | Content of NAL unit and RBSP syntax structure | NAL unit type class |
|---|---|---|---|
| ... | ... | ... | ... |
| 39 | PREFIX_SEI_NUT | Supplemental enhancement information | non-VCL |
| 40 | SUFFIX_SEI_NUT | sei_rbsp( ) | |

[Table 2] illustrates NAL unit type codes and NAL unit type classes.

The terminal device 1100 according to an embodiment may generate an SEI message including the packing structure information and may generate a bitstream composed of NAL units including the encoded packed picture and the SEI message. The packing structure information may be included in a non-VCL NAL unit of a type defined as the 39$^{th}$ or the 40$^{th}$ in the HEVC standards. A NAL may denote a network abstraction layer and a NUT may denote a NAL unit type. RBSP may denote a raw byte sequence payload, which indicates a syntax that is byte aligned and encapsulated in a NAL unit. A VCL may denote a video coding layer.

TABLE 3

| | Descriptor |
|---|---|
| sei_payload (payloadType, payloadSize) {<br>  if (nal_unit_type == PREFIX_SEI_NUT \|\|<br>    SUFFIX_SEI_NUT)<br>    ...<br>    if (payloadType == 135)<br>      mv2x_packing_structure_info (payloadSize)<br>    ...<br>} | |

[Table 3] illustrates the syntax of a general SEI message.

When nal_unit_type is PREFIX_SEI_NUT or SUFFIX_SEI_NUT, the remote control device 2000 according to an embodiment may read packing structure information mv2x_packing_structure_info (payloadSize).

TABLE 4

|  | Description |
|---|---|
| mv2x_packing_structure_info (payloadSize) { |  |
|     vehicle_position_latitude | u(32) |
|     vehicle_position_longitude | u(32) |
|     vehicle_position_elevation | u(16) |
|     vehicle_transmission_state | u(3) |
|     number_of_pictures | u(5) |
|     packed_picture_capture_time_base | u(32) |
|     packed_picture_width | u(16) |
|     packed_picture_height | u(16) |
|     packed_picture_num_units_in_tick | u(32) |
|     packed_picture_time_scale | u(32) |
|     guard_band_flag | u(1) |
|     for (i=0; i< number_of_pictures; i++) { |  |
|         camera_location_virtual_id(i) | u(5) |
|         picture_capture_time_offset(i) | u(32) |
|         projected_picture_width(i) | u(16) |
|         projected_picture_height(i) | u(16) |
|         projected_picture_num_units_in_tick(i) | u(32) |
|         projected_picture_time_scale(i) | u(32) |
|         projected_picture_location_top(i) | u(16) |
| projected_picture_ location_left(i) | u(16) |
| projected_picture_rotation (i) | u(2) |
|         if (guard_band_flag == 1) { |  |
|             left_gb_width(i) | u(8) |
|             right_gb_width(i) | u(8) |
|             top_gb_height(i) | u(8) |
|             bottom_gb_height(i) | u(8) |
|             guard_band_type(i) | u(2) |
|         } |  |
|     } |  |
| } |  |

[Table 4] illustrates mV2X Packing Structure Info SEI message syntax, a syntax structure of the SEI message including the packing structure information. In [Table 4], u(n) (n is an integer) is a function in which n bits are read from a bitstream, and then a first bit of the bits read from the bitstream is considered as MSB and interpreted without a sign.

Hereinafter, the semantics of each syntax element included in [Table 4] is described.

Vehicle_position_latitude (32 bits) is a field indicating a geographical latitude of a vehicle when a packed picture related to the vehicle is generated. A latitude is used and indicated by $\frac{1}{10}^{th}$ integer micro degrees as a value of 32 bits and based on horizontal datum in use, provides a range of plus and minus 90 degrees (that is, −900000000 to 900000001). The value of 900000001 has to be used for representing that it is unavailable. MSB of this field may have to indicate a sign of a number. To set the MSB as 0 may be about a positive number (that is, a plus value) or positive 0, and to set the MSB as 1 may be about a negative number or negative 0.

Vehicle_position_longitude (32 bits) is a field indicating a geographical longitude of the vehicle when the packed picture related to the vehicle is generated. The longitude may be a value of 32 bits, may be indicated by a $\frac{1}{10}^{th}$ integer micro degrees, and may provide a range of plus and minus 180 degrees (that is, −1799999999 to 1800000001) based on horizontal datum in use. The value of 1800000001 may have to be used for representing that it is unavailable. MSB of this field may have to indicate a sign of a number. To set the MSB as 0 may be about a positive number (that is, a plus value) or positive 0, and to set the MSB as 1 may be about a negative number or negative 0.

Vehicle_position_elevation (16 bits) is a field indicating a geographical location of the vehicle above or below a reference oval (in general, WSG-84), when the packed picture related to the vehicle is generated. The number of 16 bits has a resolution of 1 decimeter and indicates an asymmetrical range of a positive value and a negative value. This field may be encoded as below.

A range between 0x0000 and 0xEFFF (decimal numbers from 0 to 61439) corresponds to positive numbers indicating an altitude (that is, above the reference oval) between 0 and +6143.9 meters. A range between 0xF001 and 0xEFFF corresponds to negative numbers indicating an altitude (that is, below the reference oval) between −409.5 and −0.1 meters. An altitude greater than +6143.9 meters is indicated by 0xEFFF. An altitude less than −409.5 meters is indicated by 0xF001. When a transmission device does not know the altitude of a receiving device, the altitude data element may have to be encoded as 0xF000.

For example, an altitude of 0 meters may be encoded as 0x0000 and an altitude of −0.1 meters may be encoded as 0xFFFF. An altitude of +100.0 meters may be encoded as 0x03E8.

vehicle_transmission_state (3 bits) is a field that is used to provide a state of a vehicle transmission, when a packed picture related to the vehicle is generated. The semantics of the value of 3 bits indicating the state of the vehicle transmission is shown in [Table 5] below.

TABLE 5

| Value | Semantics |
|---|---|
| 0 | Neutral |
| 1 | Park |
| 2 | Forward gears |
| 3 | Reverse gears |
| 4 | Reserved |
| 5 | Reserved |
| 6 | Reserved |
| 7 | unavailable | number_of_pictures (5 bits) is a field indicating the number of projected pictures in a packed picture related to this field.

packed_picture_capture_time_base (32 bits) is a field indicating a base time to provide a time difference between each picture in the packed picture based on the base time, when the packed picture related to this field is generated. This value is a unit of a clock operating in packed_picture_time_scale Hz.

packed_picture_width (16 bits) is a field indicating a luma width of a packed picture related to this field. The value may have to be greater than 0.

packed_picture_height (16 bits) is a field indicating a luma height of a packed picture related to this field. The value may have to be greater than 0.

packed_picture_num_units_in_tick (32 bits) is a field indicating the number of time units of a clock operating at the frequency packed_picture_time_scale Hz corresponding to one increase value (referred to as a clock tick) of a clock tick counter. The value may have to be greater than 0. A clock tick in a unit of a second equals a value generated by dividing PackedPictureNumUnitsInTick by PackedPictureTimeScale. For example, when a packed picture rate of a video signal is Hz, packed_picture_time_scale may be 27000000 and packed_picture_num_units_in_tick may be equal to 1080000, and thus, the clock tick may be 0.04 seconds.

packed_picture_time_scale (32 bits) is a field indicating the number of time units passing in a second. For example, a time coordinate system measuring time by using a 27 MHz clock has packed_picture_time_scale of 27000000. The value of packed_picture_time_scale may have to be greater than 0.

guard_band_flag (1 bit) is a field indicating whether or not a packed picture related to this field applies a guard band.

camera_location_virtual_id (i) (5 bits) provides a location of a camera in the vehicle, with respect to a projected picture (i), as virtual ID. The virtual ID is mapped in an actual location of the camera in the vehicle. Mapping information of the actual location of the camera and the virtual ID may be provided through an additional channel, such as a control plane.

picture_capture_time_offset (i) (32 bits) is a field indicating a time difference (that is, a tick difference) between picture_capture_time_base and a capture time of the projected picture (i) related to this field as a clock unit operating at packed_picture_time_scale Hz.

Referring to [Table 4] again, with respect to the mV2X packing structure info SEI message syntax, projected_picture_width (i) (16 bits) is a field indicating a luma width of the projected picture (i).

projected_picture_height (i) (16 bits) is a field indicating a luma height of the projected picture (i).

projected_picture_num_units_in_tick (i) (32 bits) is a field indicating the number of time units of a clock operating at projected_picture_time_scale (i) Hz corresponding to an increase value (also referred to as a clock tick) of a clock tick counter. The value may have to be greater than 0. A clock tick in a unit of a second may be equal to a value obtained by dividing projected_picture_num_units_in_tick (i) by projected_picture_time_scale (i). For example, when a packed picture rate of a video signal is 25 Hz, packed_picture_time_scale (i) may be 27000000 and packed_picture_num_units_in tick (i) may be equal to 1080000, and thus, the clock tick may be 0.04 seconds.

projected_picture_time_scale (i) (32 bits) is a field indicating the number of time units that pass in one second. For example, a time coordinate system measuring time by using a 27 MHz clock has packed_picture_time_scale (i) of 27000000. The value of projected_picture_time_scale (i) has to be greater than 0.

projected_picture_location_top (i) (16 bits) is a field providing a vertical coordinate system about a location of the projected picture (i) in a packed picture related to this field. A top offset of the projected picture (i) in the packed picture related to this field is indicated.

projected_picture_location_left (i) (16 bits) is a field providing a horizontal coordinate system about the location of the projected picture (i) in the packed picture related to this field. A left offset of the projected picture (i) in the packed picture related to this field is indicated.

Size information of the packed picture and location information of the projected picture, included in the packing structure information according to an embodiment, are described in detail below with reference to FIG. 13.

Figure 13:
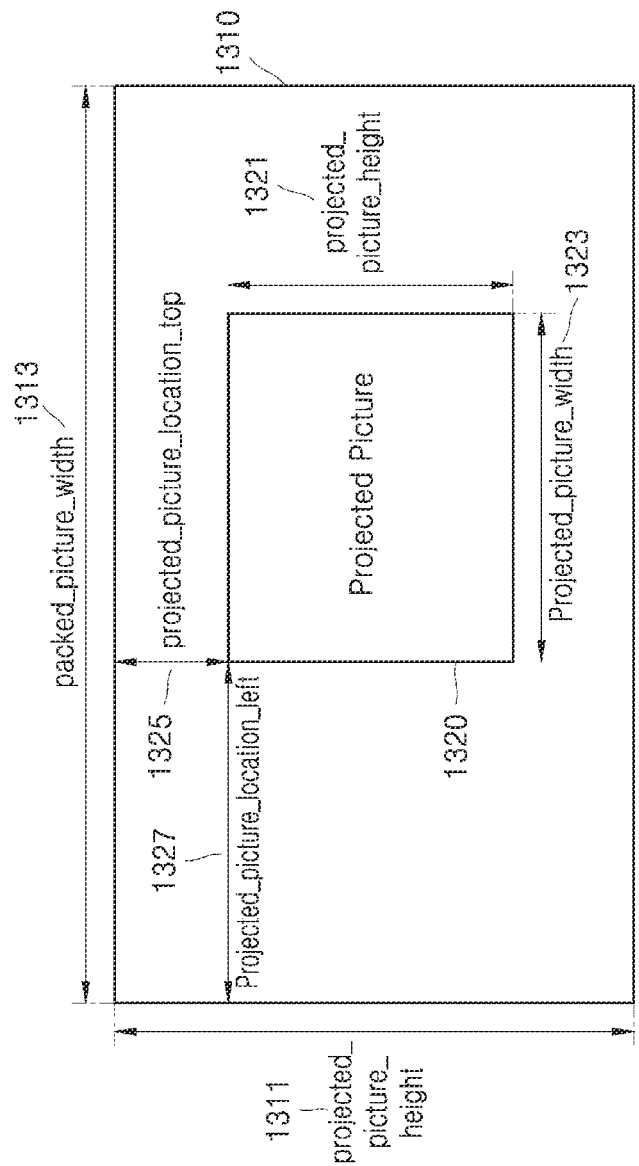

Referring to FIG. 13, the packing unit 1111 according to an embodiment may determine at least one of a height 1311 of a packed picture 1310 and a width 1313 of the packed picture 1310 as size information of a packed picture 1310 included in the packing structure information. The packing unit 1111 according to an embodiment may write the height 1311 of the packed picture 1310 in a packed_picture_height field and the width 131 of the packed picture 1310 in a packed_picture_width field as the size information of the packed picture 1310.

Also, the packing unit 1111 according to an embodiment may determine at least one of a height 1321 of a projected picture 1320 and a width 1323 of the projected picture 1320 as size information of the projected picture 1320 included in the packing structure information. The packing unit 1111 according to an embodiment may write the height 1321 of the projected picture 1320 in a projected_picture_height field and the width 1323 of the projected picture 1320 in a projected_picture_width field as the size information of the projected picture 1320.

Also, the packing unit 1111 according to an embodiment may determine at least one of a top offset 1325 of the projected picture 1320 and a left offset 1327 of the projected picture 1320 as location information of the projected picture included in the packing structure information. The packing unit 1111 according to an embodiment may write the top offset 1325 of the projected picture 1320 in a projected_picture_location_top field and the left offset 1327 of the projected picture 1320 in a projected_picture_location_left field as the location information of the projected picture 1320.

Projected_picture_rotation (i) (2 bits) in [Table 4] is a field providing a state in which a projected picture in a packed picture related to this field is rotated, in a unit of 90 degrees. When this value is set as 0, it indicates that the projected picture (i) is not rotated. When this value is set as 1, it indicates that the projected picture (i) is rotated by 90 degrees (a counter-clockwise direction), when this value is set as 2, it indicates that the projected picture (i) is rotated by 180 degrees (a counter-clockwise direction), and when this value is set as 3, it indicates that the projected picture (i) is rotated by 270 degrees (a counter-clockwise direction).

Figure 14:
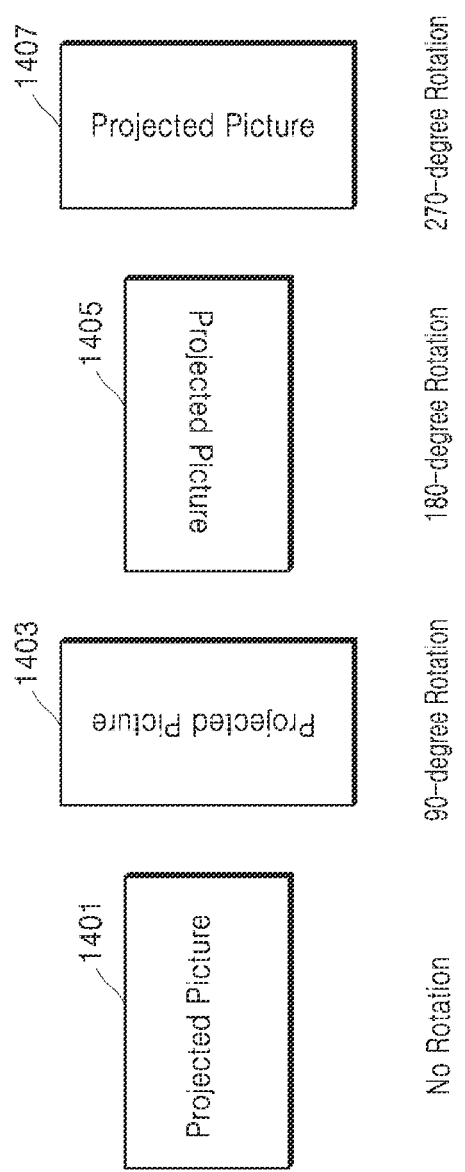

Referring to FIG. 14, the packing unit 1111 according to an embodiment may determine a value corresponding to a rotated state of the projected picture as rotation information of the projected picture included in the packing structure information.

When an input picture is projected in the packed picture without being rotated, the packing unit 1111 according to an embodiment may write 0 in the projected_picture_rotation field as the rotation information of a projected picture 1401 corresponding to the input picture. Also, when an input picture is projected in the packed picture in a state in which the input picture is rotated by 90 degrees in the counter-clockwise direction, the packing unit 1111 may write 1 in the projected_picture_rotation field as the rotation information of a projected picture 1403 corresponding to the input picture. Also, when an input picture is projected in the packed picture in a state in which the input picture is rotated by 180 degrees in the counter-clockwise direction, the packing unit 1111 may write 2 in the projected_picture_rotation field as the rotation information of a projected picture 1405 corresponding to the input picture. Also, when an input picture is projected in the packed picture in a state in which the input picture is rotated by 270 degrees in the counter-clockwise direction, the packing unit 1111 may write 3 in the projected_picture_rotation field as the rotation information of a projected picture 1407 corresponding to the input picture.

Left_gb_width (i) of [Table 4] is a field specifying a luma width of a left guard band of the projected picture (i) related to this field. A luma height of the left guard band is the same as a luma height of the projected picture (i) related to this field.

right_gb_width (i) (8 bits) is a field specifying a luma width of a right guard band of the projected picture (i) related to this field. The luma height of the right guard band is the same as the luma height of the projected picture (i) related to this field.

top_gb_height (i) (8 bits) is a field specifying a luma height of a top guard band of the projected picture (i) related to this field. The luma width of the top guard band is the same as a luma width of the projected picture (i) related to this field.

bottom_gb_height (i) (8 bits) is a field specifying a luma height of a bottom guard band of the projected picture (i) related to this field. The luma width of the bottom guard band is the same as the luma width of the projected picture (i) related to this field. Hereinafter, size information and location information of the guard band included in the packing structure information are described in detail with reference to FIG. 15.

guard_band_type (i) (2 bits) is a field designating a type of a guard band applied to the projected picture (i). When this value is set as 0, it is designated that the content of the guard band is not designated, and when this value is set as 1, it indicates that a guard sample of the projected picture (i) is horizontally or vertically copied in the guard band, and other values of this field are reserved.

Figure 15:
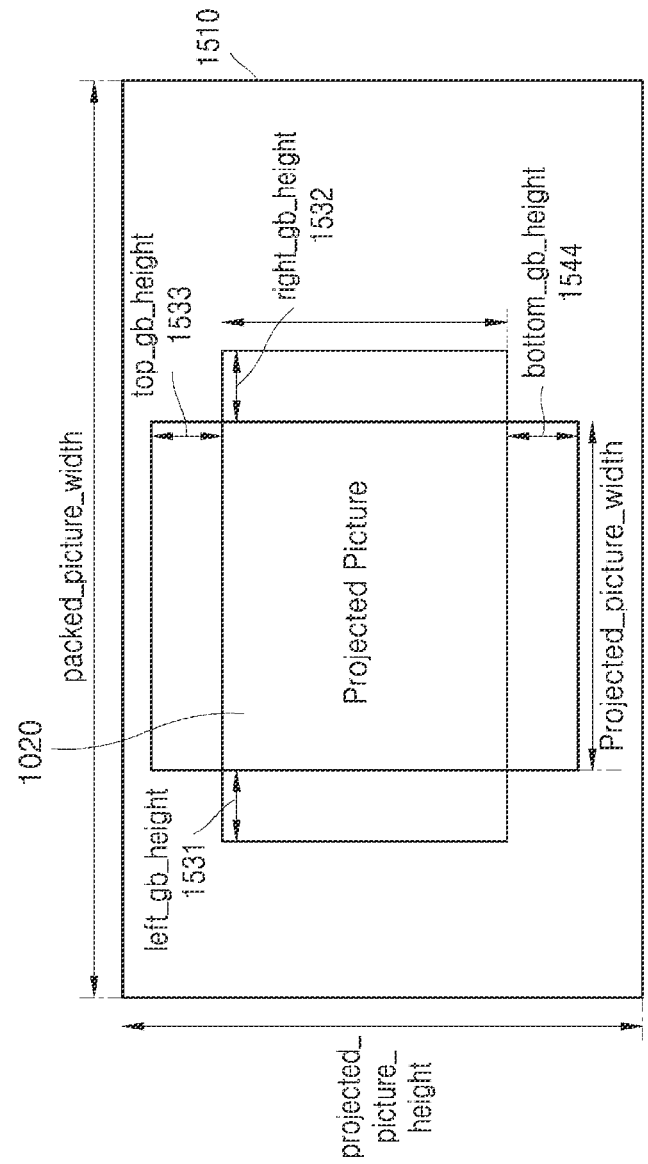

Referring to FIG. 15, the packing unit 1111 according to an embodiment may output size information of a guard band surrounding a projected picture 1050 as the packing structure information.

The packing unit 1111 according to an embodiment may determine at least one of a width 1531 of a left guard band, a width 1532 of a right guard band, a height 1533 of a top guard band, and a height 1544 of a bottom guard band, as the size information of guard band included in the packing structure information. The packing unit 1111 according to an embodiment may write the width 1531 of the left guard band in a left_gb_width field, the width 1532 of the right guard band in a right_gb_width field, the height 1533 of the top guard band in a top_gb_height field, and the height 1544 of the bottom guard band in a bottom_gb_height field as the size information of the guard band.

The terminal device 1100 according to an embodiment may determine a packing structure based on a driving state of the vehicle. For example, the driving state of the vehicle in which cameras configured to capture a plurality of input pictures are mounted may be written in a vehicle_transmissoin_state field.

For example, the terminal device 1100 of FIG. 11 may determine the packing structure such that a projected picture corresponding to a direction in which the vehicle in which the terminal device 1100 is mounted moves is included in a packed picture to have a higher resolution than other projected pictures. According to an embodiment, when the vehicle moves forward, a resolution of a projected picture indicating a front condition may be increased, and when the vehicle moves backward, a resolution of a projected picture indicating a rear condition may be increased, to facilitate safe driving during remote controlling.

For example, a plurality of input pictures according to an embodiment may include a first input picture and a second input picture. The first input picture may include a picture received from a camera mounted at a front portion of the vehicle. The second input picture may include a picture received from a camera mounted at a rear portion of the vehicle.

When the vehicle moves forward, the terminal device 1100 according to an embodiment may determine the packing structure such that the first input picture is included in the packed picture to have a greater size than the second input picture. When the vehicle moves backward, the terminal device 1100 according to an embodiment may determine the packing structure such that the second input picture is included in the packed picture to have a greater size than the first input picture.

The terminal device 1100 according to an embodiment may adjust a resolution of the projected picture that is transmitted, by adjusting a size of the projected picture in the packed picture. For example, the terminal device 1100 according to an embodiment may increase a resolution of a predetermined projected picture by increasing a size of the projected picture in the packed picture. Also, the terminal device 1100 may decrease a resolution of a predetermined projected picture by decreasing a size of the projected picture in the packed picture.

Also, the terminal device 1100 according to an embodiment may generate a projected picture obtained by rotating an input picture and arrange the generated projected picture in the packed picture, in order to maximize the use of a space of the packed picture. Resolution and rotation Information of the projected picture included in the packed picture may be included in the packing structure information for transmission.

A packed picture 1610 of FIG. 16 is a packed picture generated when the vehicle moves forward, and a packed picture 1630 is a packed picture generated when the vehicle moves backward.

As illustrated in FIG. 16, the packed picture 1610 may be generated by combining a plurality of projected pictures 1611, 1612, 1613, 1614, and 1615. Here, the plurality of projected pictures 1611, 1612, 1613, 1614, and 1615 may be generated by adjusting sizes of input pictures received from cameras mounted in a front left side, a front right side, a left side, a rear side, and a right side of the vehicle, respectively. The packing unit 1111 of the terminal device 1100 according to an embodiment may generate the projected pictures included in the packed picture by adjusting a size of at least one input picture from among the input pictures.

As illustrated in FIG. 16, when the vehicle moves forward, the terminal device 1100 according to an embodiment may determine a packing structure such that the projected pictures 1611 and 1612 indicating a condition of the front side are included in the packed picture 1610 to have a greater size than the projected pictures 1613, 1614, and 1615 indicating conditions of other sides.

In contrast, when the vehicle moves backward, the terminal device 1100 according to an embodiment may determine the packing structure such that a projected picture 1634 indicating a condition of the rear side is included in the packed picture 1630 to have a greater size than projected pictures 1631, 1632, 1633, and 1635 indicating conditions of other sides. The terminal device 1100 according to an embodiment may generate the projected picture by adjusting sizes of the input pictures and rotating the input pictures based on the determined packing structure.

The packed picture and the packing structure information generated according to the embodiments described in detail may be encoded and transmitted to the remote control device 2000 as described below.

Figure 17:
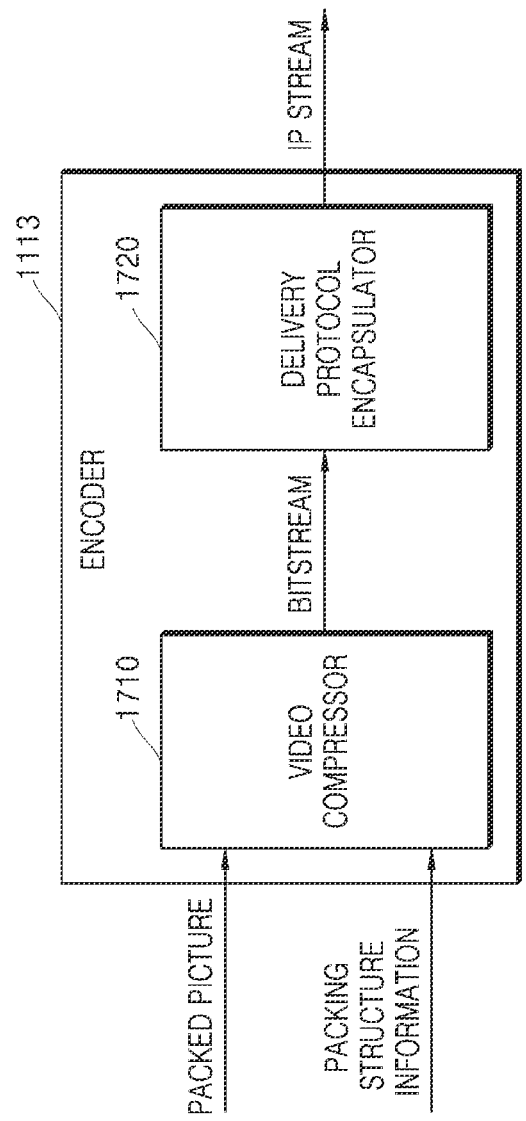
FIG. 17 illustrates a structure of an encoder according to an embodiment.

FIG. 17 illustrates a structure of an encoder according to an embodiment.

As illustrated in FIG. 17, the encoder 1113 according to an embodiment may receive the packed picture and the packing structure information from the packing unit 1111.

The encoder 1113 according to an embodiment may generate and output an IP stream based on the packed picture and the packing structure information that are received. The encoder 1113 may include a video compressor 1710 configured to generate an encoded picture stream and output NAL units and a delivery protocol encapsulator 1720 configured to generate and output an IP stream.

The video compressor 1710 may include, for example, an HEVC encoder. The video compressor 1710 may receive the packed picture and the packing structure information from the packing unit 1111 and may perform video-compression on the packed picture to generate the encoded packed picture. Also, the video compressor 1710 may generate the packing structure information as an SEI message and may output a bitstream composed of NAL units for a compressed video stream including the encoded packed picture.

Like a general video codec (for example, HEVC, H. 264, etc.), the video compressor 1710 may output a bitstream composed of NAL units including all general data including the encoded picture and the SEI message for compression, transmission, and reception of video data. However, according to an embodiment, the video compressor 1710 may further include a process of generating the NAL units by adding the packing structure information in the SEI message.

The delivery protocol encapsulator 1720 according to an embodiment may receive the bitstreams composed of the NAL units from the video compressor 1710. The delivery protocol encapsulator 1720 may generate and output an IP stream by encapsulating the received bitstreams via a delivery protocol (for example, TS, RTP, MMT, FLUS, etc.).

The communicator 1130 of the terminal device 1100 according to an embodiment may transmit the IP stream generated by the encoder 1113 to the remote control device 2000. The communicator 1130 according to an embodiment may receive the IP stream from the encoder 1113 and transmit the IP stream through a network. The remote control device 2000 may receive the IP stream through the network.

Figure 18:
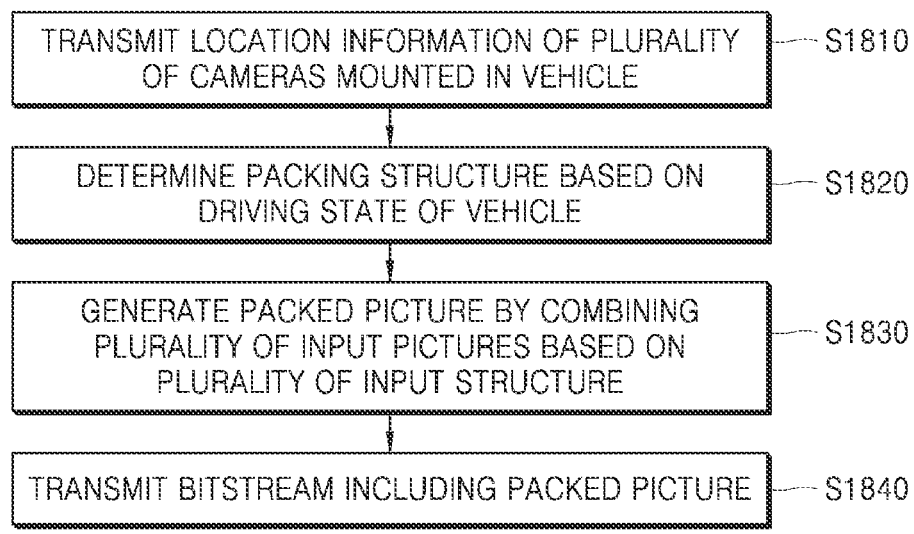
FIG. 18 is a flowchart of a method of transmitting a picture, according to an embodiment.

FIG. 18 is a flowchart of a method, performed by the terminal device 1100 mounted in the vehicle, to transmit a picture to the remote control device 2000 controlling driving of the vehicle, according to an embodiment.

Each operation of the method described below may be performed by each component of the terminal device 1100 illustrated in FIG. 11. The descriptions above with respect to the terminal device 1100 may be applied to each operation of the method below.

In operation S1810, the terminal device 1100 according to an embodiment may transmit location information of a plurality of cameras mounted in the vehicle to the remote control device. The terminal device 1100 may transmit at least one of size information of the vehicle and direction information of the plurality of cameras, along with the location information of the plurality of cameras.

The terminal device 1100 may transmit at least one of the location information of the cameras, the size information of the vehicle, and the direction information of the cameras, through negotiation with the remote control device 2000 for a picture transmission condition. The location information of the plurality of cameras, the size information of the vehicle, and the direction information of the plurality of cameras may be indicated as an X-axis value, a Y-axis value, and a Z-axis value on a three-dimensional space.

A direction of the camera mounted in the vehicle may be changed. The terminal device 1100 according to an embodiment may receive a control signal from the remote control device 2000 and may change a direction of at least one of the plurality of cameras based on the received control signal.

In operation S1820, the terminal device 1100 according to an embodiment may determine a packing structure based on a driving state of the vehicle.

The terminal device 1100 according to an embodiment may receive a control signal from the remote control device 2000 and may determine the driving state of the vehicle based on the received control signal. The terminal device 1100 according to an embodiment may determine a driving direction of the vehicle based on the received control signal and may determine the packing structure based on the driving direction of the vehicle.

For example, when the terminal device 1100 generates a packed picture by combining a plurality of input pictures captured by the plurality of cameras based on the packing structure, the plurality of input pictures may include a first input picture and a second input picture. When the vehicle moves forward, the terminal device 1100 may determine the packing structure such that the first input picture is included in the packed picture to have a greater size than the second input picture (such that a resolution of a projected picture of the first input picture is greater than a resolution of a projected picture of the second input picture). The first input picture may correspond to a front side of the vehicle. When the vehicle moves backward, the terminal device 1100 may determine the packing structure such that the second input picture is included in the packed picture to have a greater size than the first input picture.

Alternatively, the terminal device 1100 according to an embodiment may receive packing structure information related to the driving state of the vehicle from the remote control device 2000 and may determine the packing structure based on the received information.

In operation S1830, the terminal device 1100 according to an embodiment may generate the packed picture by combining the plurality of input pictures captured by the plurality of cameras based on the packing structure.

The terminal device 1100 according to an embodiment may generate a plurality of projected pictures by adjusting a size of at least one from among the plurality of input pictures or rotating at least one from among the plurality of input pictures based on the packing structure. The terminal device 1100 according to an embodiment may generate the packed picture by combining the plurality of projected pictures.

The terminal device 1100 according to an embodiment may generate and output packing structure information. For example, the packing structure information may include at least one of information about a device configured to capture the plurality of input pictures, information indicating a feature of the packed picture, and information indicating a feature of the projected pictures included in the packed picture.

Also, the packing structure information may include at least one of information about a size of one of the plurality of projected pictures included in the packed picture, information about a location of the projected picture in the packed picture, and information about whether or not the projected picture is generated by rotating the input picture.

In operation S1840, the terminal device 1100 according to an embodiment may transmit a bitstream including the packed picture. The terminal device 1100 according to an embodiment may generate the bitstream including the packing structure information and the packed picture.

The terminal device 1100 according to an embodiment may encode the packed picture and generate a supplemental enhancement information (SEI) message including the packing structure information. The terminal device 1100 may generate the bitstream composed of network abstraction layer (NAL) units including the encoded packed picture and the SEI message. The terminal device 1100 may transmit the bitstream to the remote control device 2000. The terminal device 1100 may transmit an IP stream including the bitstream to the remote control device 2000 through a network.

Figure 19:
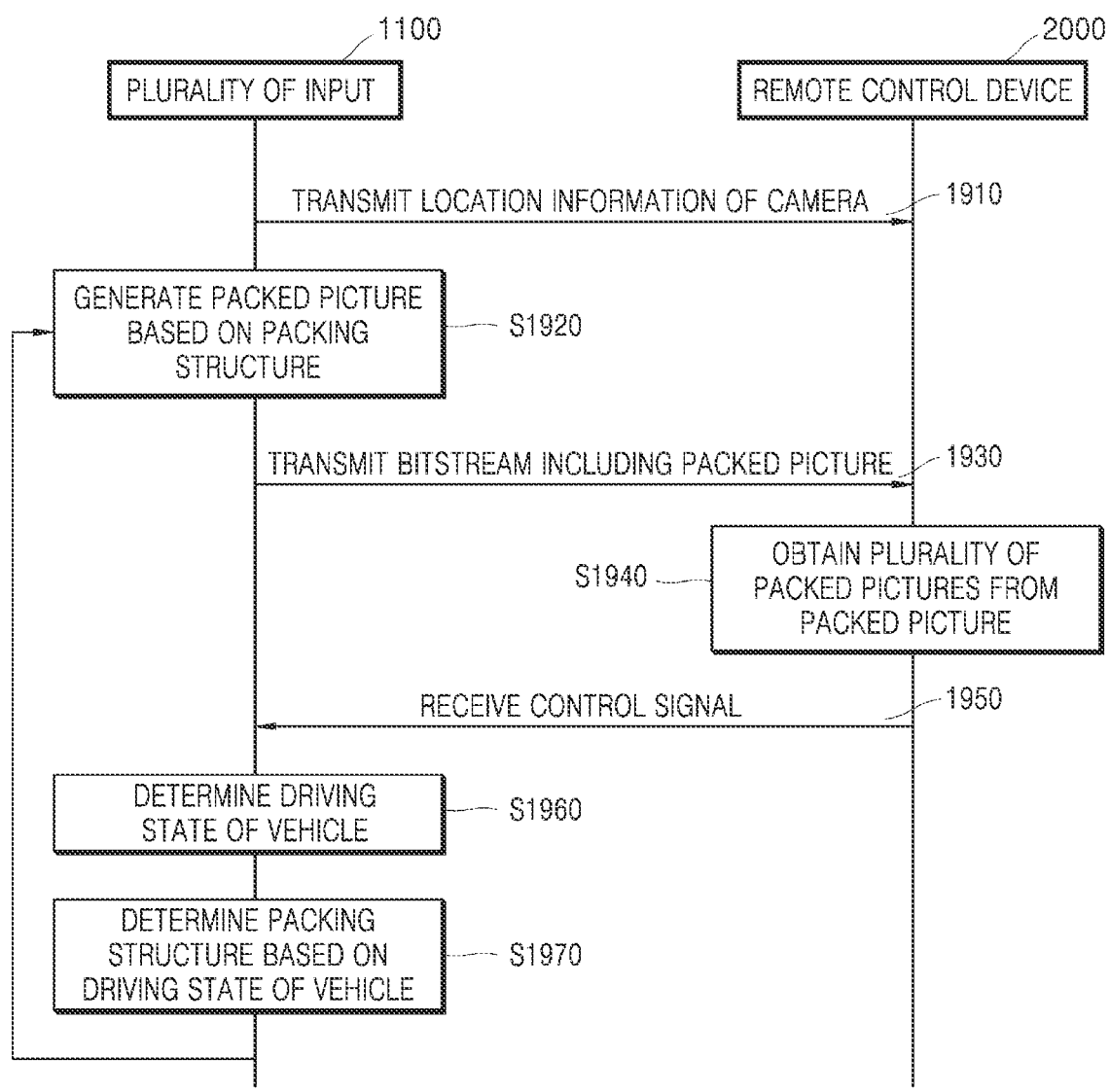
FIG. 19 is a signal flowchart of a method, performed by a picture communication system, of transmitting and receiving a picture, according to an embodiment.

FIG. 19 is a signal flowchart of a method, performed by the terminal device 1100 mounted in the vehicle, to transmit a picture to the remote control device 2000 controlling driving of the vehicle, according to an embodiment.

Each operation of the method described below may be performed by each component of the terminal device 1100 illustrated in FIG. 11 and the remote control device 2000 illustrated in FIG. 20. The descriptions related to the terminal device 1100 and the remote control device 2000 may be applied to each operation of the method described below.

In operation S1910, the terminal device 1100 according to an embodiment may transmit location information of a camera capturing a surrounding environment of the vehicle in which the terminal device 1100 is mounted.

Before the vehicle in which the terminal device 1100 is mounted is remotely controlled by the remote control device 2000, the terminal device 1100 may negotiate with the remote control device 2000 to form a session to transmit data and a picture of the surrounding environment of the vehicle.

The terminal device 1100 according to an embodiment may determine information about a video parameter (for example, a bit rate, a packing structure, etc.) of a packed picture to be transmitted, via negotiation with the remote control device 2000, and may transmit the packed picture based on the determined information. In the process of negotiation between the terminal device 1100 and the remote control device 2000, the terminal device 1100 may transmit the location information of the camera. Also, the terminal device 1100 may transmit at least one of size information of the vehicle and direction information of the camera.

In operation S1920, the terminal device 1100 according to an embodiment may generate the packed picture based on a packing structure.

The terminal device 1100 may determine the packing structure based on the video parameter (for example, a codec, a data rate, a resolution, size information of the vehicle, driving information of the vehicle, location information of the camera, direction information of the camera, etc.) determined through the process of negotiation with the remote control device 2000.

Also, the terminal device 1100 according to an embodiment may determine the packing structure based on a driving state of the vehicle. Before the vehicle starts to drive, the terminal device 1100 according to an embodiment may determine the packing structure such that all of the plurality of input pictures included in the packed picture have the same quality or may determine the packing structure as a predetermined default packing structure.

In operation S1930, the terminal device 1100 according to an embodiment may transmit a bitstream including the generated packed picture to the remote control device 2000.

In operation S1940, the remote control device 2000 according to an embodiment may obtain the packed picture from the received bitstream and obtain a plurality of output pictures from the packed picture.

In operation S1950, the terminal device 1100 according to an embodiment may receive a control signal for controlling the vehicle, from the remote control device 2000.

The remote control device 2000 may generate the control signal for controlling the vehicle, based on received pictures.

For example, a user of the remote control device 2000 may input a user command for controlling driving of the vehicle into the remote control device 2000 by taking into account the plurality of output pictures. The remote control device 2000 may generate the control signal based on the user command. As another example, the remote control device 2000 may determine a driving direction of the vehicle to reach a destination by analyzing the plurality of output pictures and generate the control signal based on the driving direction.

The remote control device 2000 may transmit the generated control signal to the terminal device 1100, and the terminal device 1100 may receive the control signal.

In operation S1960, the terminal device 1100 according to an embodiment may determine a driving state of the vehicle based on the received control signal. For example, the terminal device 1100 may determine a driving direction of the vehicle based on the control signal.

In operation S1970, the terminal device 1100 according to an embodiment may determine a packing structure based on the driving state of the vehicle.

For example, the terminal device 1100 according to an embodiment may determine the packing structure according to the driving direction of the vehicle. The terminal device 1100 may determine the packing structure such that a picture corresponding to the driving direction of the vehicle is included in the packed picture to have a greater size than other pictures (or such that a resolution of a picture corresponding to the driving direction of the vehicle is greater than a resolution of other pictures). For example, when the vehicle moves forward, the terminal device 1100 may determine the packing structure such that a picture indicating a front environment of the vehicle is included in the packed picture to have a greater size than other pictures.

The terminal device 1100 according to an embodiment may repeat operations S1920 through S1970, until the vehicle ends the remote control driving. Thus, the terminal device 1100 may adaptively change a data rate of pictures in the packed picture according to the driving direction of the vehicle. When the driving direction of the vehicle is forward, the terminal device 1100 may generate the packed picture in which a relatively greater data rate is assigned to the front picture of the vehicle and may transmit the packed picture to the remote control device 2000. When the driving direction of the vehicle is backward, the terminal device 1100 may generate the packed picture in which a relatively greater data rate is assigned to the rear picture of the vehicle and may transmit the packed picture to the remote control device 2000.

In a picture communication system according to an embodiment, the remote control device 2000, rather than the terminal device 1100, may determine the packing structure based on the driving direction of the vehicle.

Hereinafter, an operation, performed by the remote control device 2000 according to an embodiment, of determining a packing structure based on a driving state of the vehicle, receiving an IP stream including a packed picture from the terminal device 1100, and outputting a plurality of output pictures from the IP stream, is described with reference to FIGS. 20 through 24.

Figure 20:
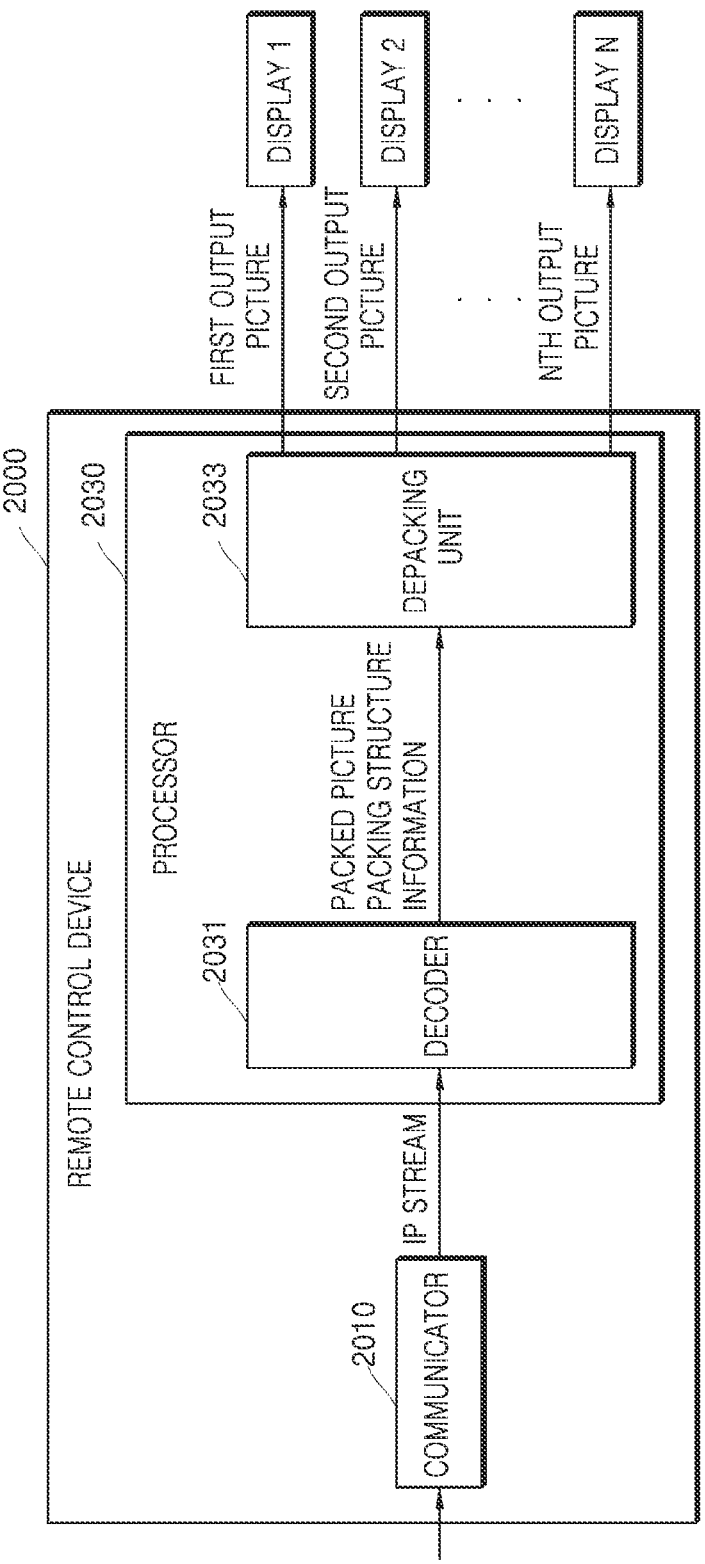
FIG. 20 illustrates a structure of a remote control device according to an embodiment.

FIG. 20 illustrates a structure of a remote control device according to an embodiment.

The remote control device 2000 according to an embodiment may include the communicator 2010 configured to output an IP stream by processing the data received through a network and the processor 2030 configured to output a plurality of pictures based on the IP stream.

The remote control device 2000 according to an embodiment may output the plurality of output pictures to at least one display. Alternatively, the remote control device 2000 according to an embodiment may include at least one display configured to display the plurality of output pictures.

The processor 2030 according to an embodiment may control general operations of the remote control device 2000. For example, the processor 2030 may control the communicator 2010. FIG. 20 illustrates that the remote control device 2000 includes one processor 2030. However, embodiments are not limited thereto, and the remote control device 2000 may include a plurality of processors 2030. Also, the processor 2030 may negotiate a picture transmission condition with the processor 1110 of the terminal device 1100.

The processor 2030 according to an embodiment may include a decoder 2031 and a depacking unit 2033. The decoder 2031 and the depacking unit 2033 illustrated in FIG. 15 may be hardware components or functional blocks realized by the processor 2030. Thus, operations of the decoder 2031 and the depacking unit 2033 described hereinafter may be performed by the processor 2030.

The communicator 2010 according to an embodiment may exchange data with the terminal device 1100 mounted in the vehicle. When the communicator 2010 negotiates the picture transmission condition, the communicator 2010 according to an embodiment may receive at least one of size information of the vehicle in which the terminal device 1100 is mounted, location information of a camera mounted in the vehicle, and direction information of the camera.

In detail, the communicator 2010 may receive location information of a plurality of cameras mounted in the vehicle. The location information of the cameras may be indicated as an X-axis value, a Y-axis value, and a Z-axis value on a three-dimensional space set based on a size of the vehicle. Also, the communicator 2010 may receive the size information of the vehicle and direction information of the plurality of cameras, along with the location information of the plurality of cameras.

The processor 2030 according to an embodiment may transmit a control signal for changing a direction of at least one of the plurality of cameras to the terminal device 1100, through the communicator 2010. The terminal device 1100 may transmit information about a direction of the vehicle that is changed based on the received control signal to the communicator 2010.

The processor 2030 according to an embodiment may transmit a control signal for controlling driving of the vehicle and packing structure information through the communicator 2010. The packing structure information may be determined based on a driving direction of the vehicle. The terminal device 1100 may generate a packed picture, by combining a plurality of input pictures captured by the plurality of cameras based on the packing structure information received from the remote control device 2000. The terminal device 1100 may transmit a bitstream including the generated packed picture and the packing structure information used to generate the packed picture, to the remote control device 2000.

The processor 2030 according to an embodiment may include the decoder 2031 configured to receive an IP stream including the bitstream from the communicator 2010 and extract an encoded packed picture from the bitstream included in the IP stream. The decoder 2031 may extract the encoded packed picture from the bitstream composed of NAL units. The decoder 2031 may obtain a packed picture by decoding the encoded packed picture. Also, the decoder 2031 of the processor 2030 according to an embodiment may further extract the packing structure information from the bitstream included in the IP stream. The decoder 2031 may extract the encoded packed picture and an SEI message from the bitstream composed of NAL units and may extract the packing structure information from the SEI message.

The processor 2030 according to an embodiment may include the depacking unit 2033 configured to generate the plurality of output pictures based on the packing structure information and the packed picture.

The packing structure information according to an embodiment may include at least one of information about the cameras capturing the input pictures included in the packed picture (for example, locations of the cameras, directions of the cameras, etc.), information indicating a feature of the packed picture, and information indicating a feature of sub-pictures included in the packed picture.

The depacking unit 2033 according to an embodiment may obtain the plurality of output pictures from the packed picture based on the packing structure information. The processor 2030 may obtain a plurality of projected picture from the packed picture based on the packing structure information. The processor 2030 may generate the plurality of output pictures, by adjusting a size of at least one of the plurality of projected pictures or rotating at least one of the plurality of projected pictures based on the packing structure information.

For example, the packing structure information according to an embodiment may include at least one of information about a size of one of the plurality of projected pictures included in the packed picture, information about a location of the projected picture in the packed picture, and information about whether or not the projected picture is generated by rotating the input picture. For example, the packing structure information may be determined based on which direction the control signal controlling the driving of the vehicle instructs to.

For example, the plurality of output pictures may include a first output picture and a second output picture. The first output picture may correspond to an input picture captured by a camera mounted at the front side of a capturing device. The second output picture may correspond to an input picture captured by a camera mounted at the rear side of the capturing device.

When the control signal transmitted to the terminal device 1100 is a control signal for moving the vehicle forward, the processor 2030 according to an embodiment may obtain the plurality of output pictures such that the first output picture is greater (or hto have a higher resolution) than the second output picture. When the control signal transmitted to the terminal device 1100 is a control signal for moving the vehicle backward, the processor 2030 according to an embodiment may obtain the plurality of output pictures such that the second output picture is greater (or hto have a higher resolution) than the first output picture. The size (or the resolution) of the output picture may become different according to the control signal, because the terminal device 1100 may determine the driving direction of the vehicle based on the control signal and may generate the packed picture based on the driving direction of the vehicle.

Figure 21:
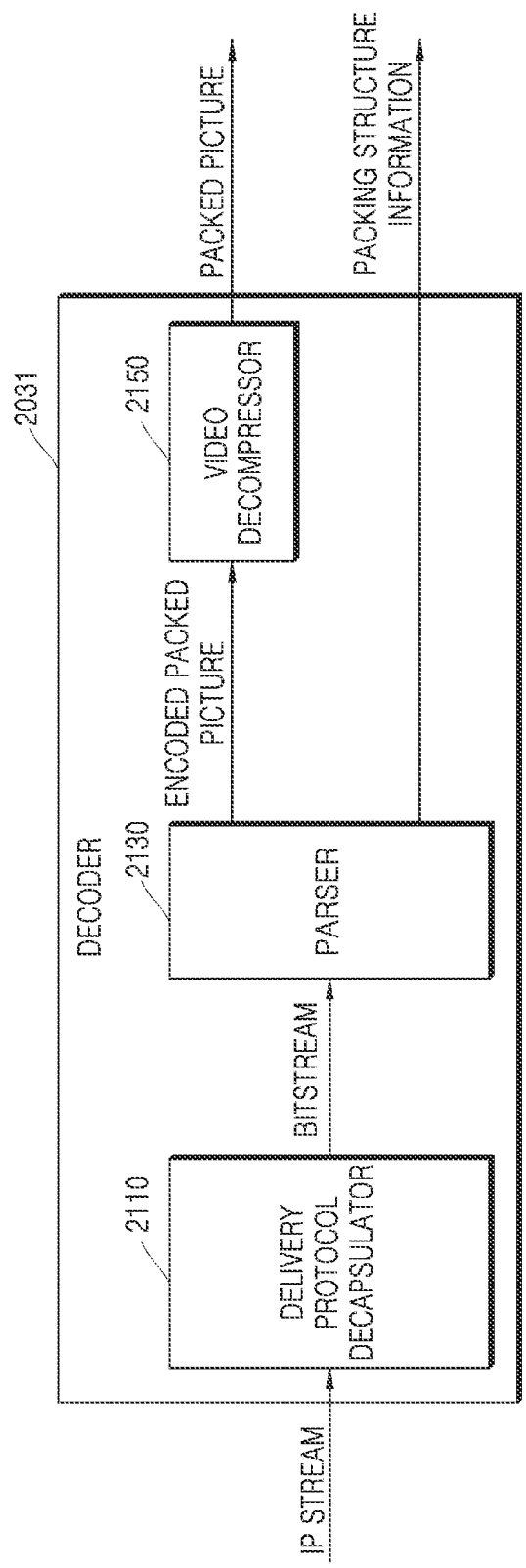
FIG. 21 illustrates a structure of a decoder according to an embodiment.

FIG. 21 illustrates a structure of a decoder according to an embodiment. The decoder 2031 according to an embodiment may include a parser 2130 configured to extract packing structure information and an encoded packed picture from a bitstream included in an IP stream that is received and a video decompressor 2150 configured to decode the encoded packed picture.

The decoder 2031 according to an embodiment may include a delivery protocol decapsulator 2110 configured to decapsulate the received IP stream and output the bitstream composed of NAL units. The parser 2130 may extract the encoded packed picture and an SEI message from the NAL units of the received bitstream and obtain and output the packing structure information from the SEI message. The video decompressor 2150 may output a decoded packed picture by performing de-compression on the received encoded packed picture. The video decompressor 2150 may correspond to the video compressor 1710 of the terminal device 1100. For example, the video decompressor 2150 may include an HEVC decoder.

Figure 22:
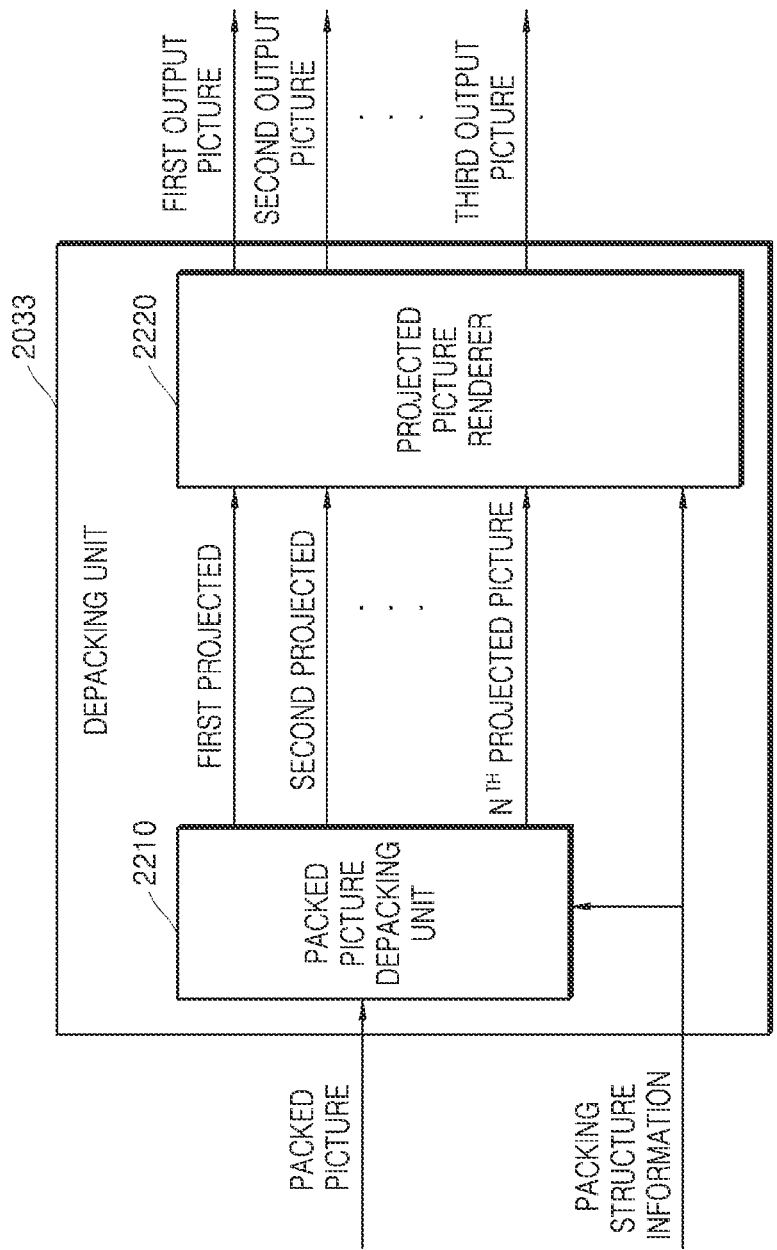
FIG. 22 illustrates a structure of a depacking unit according to an embodiment.

The packed picture and the packing structure information that are output from the decoder 2031 according to an embodiment may be input into a depacking unit 2033 of FIG. 22.

FIG. 22 illustrates a structure of a depacking unit according to an embodiment.

The depacking unit 2033 according to an embodiment may perform depacking based on the encoded packed picture and the packing structure information that are output from the decoder 2031 and then may output output pictures through rendering. For example, the depacking unit 2033 may output the output pictures to at least one display.

The depacking unit 2033 according to an embodiment may include a packed picture depacking unit 2210 configured to output projected pictures by depacking the encoded packed picture based on the packing structure information and a projected picture renderer 2220 configured to generate the output pictures by rendering the projected pictures based on the packing structure information.

The packed picture depacking unit 2210 may obtain and output the projected pictures based on location information, a rotation state, etc. of each projected picture included in the packed picture, based on the packing structure information. The projected picture renderer 2220 may output the output pictures based on the rotation state, a resolution, and/or a frame rate of each projected picture determined based on the packing structure information.

Also, the projected picture renderer 2220 according to an embodiment may output the output pictures based on at least one of location information of the camera, size information of the vehicle, and direction information of the camera that are received from the terminal device 1100. The projected picture renderer 2220 may relatively more vividly realize a surrounding environment of the vehicle, by arranging or correcting the output picture based on at least one of the location information of the camera, the size information of the vehicle, and the direction information of the camera.

The terminal device 1100 according to an embodiment may transmit information about a size of the vehicle to the remote control device 2000 in the negotiation process, to help the remote control device 2000 control the vehicle such that the vehicle maintains the location thereof within the width of the road. When the remote control device 2000 controls the vehicle, the size information of the vehicle may be used to measure a probability of collision between the vehicle and a surrounding building on the road or a surrounding vehicle when the vehicle turns left or right. Also, in order to control the vehicle to drive on the road having a height limit, such as a tunnel, information about a height of the vehicle may be necessarily required for the remote control device 2000.

Also, according to the location information of the camera and/or the direction information of the camera received from the terminal device 1100 in the negotiation process, the remote control device 2000 may identify at which location and which angle of the vehicle, the pictures included in the received packed picture are obtained. Thus, the remote control device 2000 may relatively more correctly recognize the surrounding condition of the vehicle based on the location information of the vehicle and other information received in the negotiation process.

Figure 23:
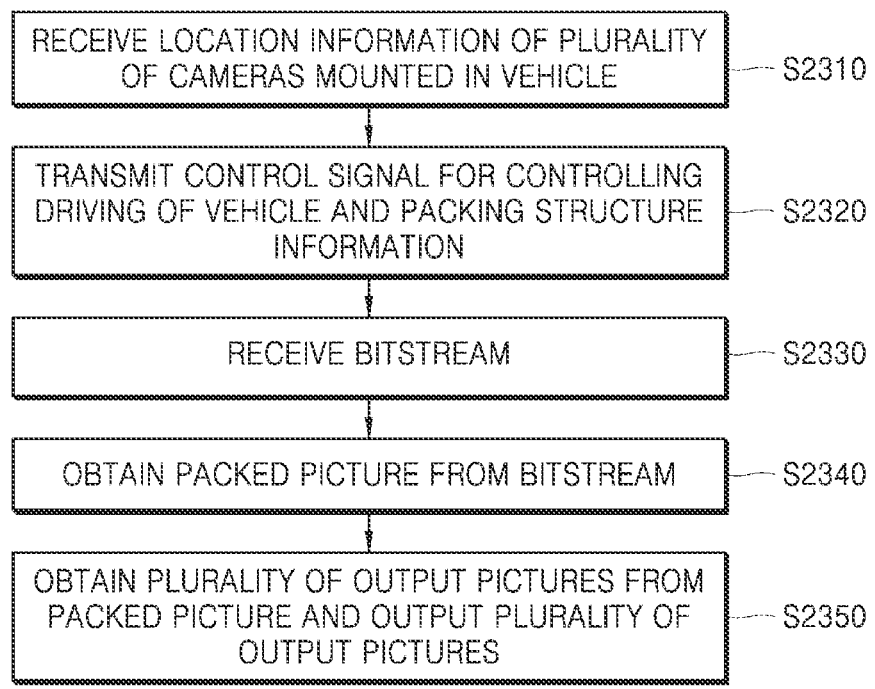
FIG. 23 is a flowchart of a method of receiving a picture, according to an embodiment.

FIG. 23 is a flowchart of a method, performed by the remote control device 2000 controlling driving of the vehicle according to an embodiment, of receiving a picture from the terminal device 1100 mounted in the vehicle.

Each operation of the method described below may be performed by each component of the remote control device 2000 illustrated in FIG. 20. The descriptions with respect to the remote control device 2000 may be applied to each operation of the method below.

In operation S2310, the remote control device 2000 according to an embodiment may receive location information of the plurality of cameras mounted in the vehicle from the terminal device 1100.

The remote control device 2000 may receive at least one of size information of the vehicle and direction information of the plurality of cameras, along with the location information of the plurality of cameras, through a negotiation process for a picture transmission condition. The location information of the plurality of cameras, the size information of the vehicle, and the direction information of the plurality of cameras may be indicated as an X-axis value, a Y-axis value, and a Z-axis value on a three-dimensional space.

The remote control device 2000 according to an embodiment may transmit a control signal for changing a direction of at least one of the plurality of cameras to the terminal device 1100. The terminal device 1100 may transmit information about a direction of the camera that is changed based on the received control signal, to the remote control device 2000.

In operation S2320, the remote control device 2000 according to an embodiment may transmit a control signal for controlling driving of the vehicle and packing structure information.

The packing structure information may be determined based on a driving direction of the vehicle. The terminal device 1100 may generate a packed picture by combining a plurality of input pictures captured by the plurality of cameras based on the packing structure information received from the remote control device 2000. The terminal device 1100 may transmit a bitstream including the packing structure information and the packed picture to the remote control device 2000. For example, the packing structure information may include at least one of information about a size of each of the plurality of input pictures, information about a location of each of the plurality of input pictures in the packed picture, and information about whether or not each of the plurality of input pictures is rotated in the packed picture.

In operation S2330, the remote control device 2000 according to an embodiment may receive the bitstream. The remote control device 2000 may receive an IP stream including the bitstream by processing the data received through a network.

In operation S2340, the remote control device 2000 according to an embodiment may obtain the packed picture from the bitstream.

The remote control device 2000 according to an embodiment may extract an encoded packed picture and an SEI message from the bitstream composed of NAL units and may extract the packing structure information from the SEI message. The packing structure information extracted from the bitstream may include at least a portion of the packing structure information transmitted from the remote control device 2000 to the terminal device 1100 in operation S2320.

In operation S2350, the remote control device 2000 according to an embodiment may obtain a plurality of output pictures from the packed picture based on the packing structure information and output the plurality of output pictures.

The remote control device 2000 according to an embodiment may obtain a plurality of projected pictures from the packed picture based on the packing structure information. The remote control device 2000 may generate the plurality of output pictures by adjusting a size of at least one of the plurality of projected pictures or rotating at least one of the plurality of projected pictures.

An example in which the plurality of output pictures include a first output picture and a second output picture is described. When the control signal for controlling driving of the vehicle, which is transmitted from the remote control device 2000, is for moving the vehicle forward, the remote control device 2000 according to an embodiment may obtain the plurality of output pictures such that the first output picture is greater than the second output picture. When the control signal is for moving the vehicle backward, the remote control device 2000 may obtain the plurality of output pictures such that the second output picture is greater than the first output picture.

The remote control device 2000 may output the plurality of output pictures to at least one display, such that the plurality of output pictures are displayed on the at least one display.

Figure 24:
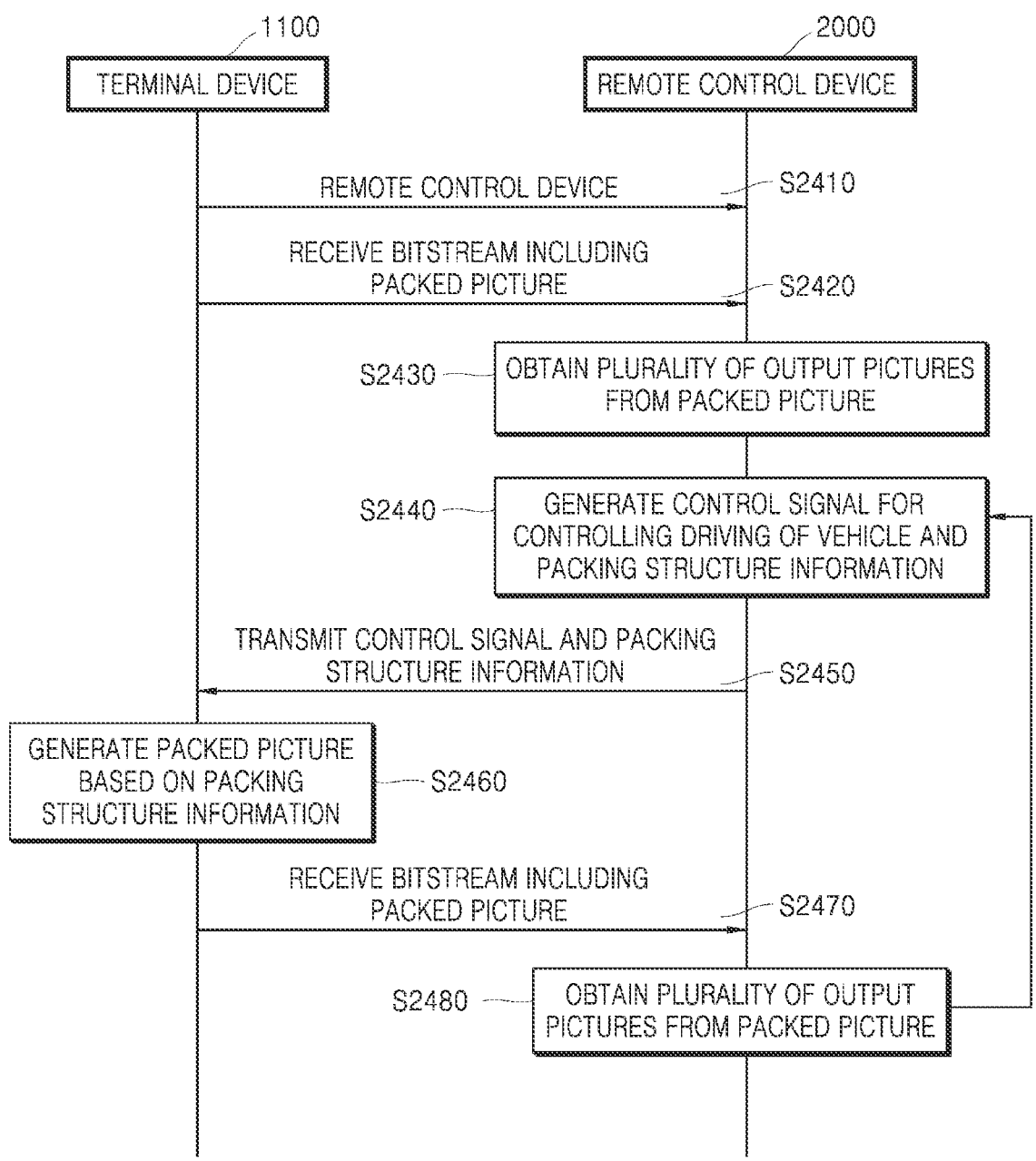
FIG. 24 is a signal flowchart of a method, performed by a picture communication system, of transmitting and receiving a picture, according to an embodiment.

FIG. 24 is a signal flowchart of a method, performed by the remote control device 2000 controlling driving of the vehicle according to an embodiment, of receiving a picture from the terminal device 1100 mounted in the vehicle.

Each operation of the method described below may be performed by each component of the terminal device 1100 illustrated in FIG. 11 and the remote control device 2000 illustrated in FIG. 20. The descriptions related to the terminal device 1100 and the remote control device 2000 may be applied to each operation of the method described below.

In operation S2410, the remote control device 2000 according to an embodiment may receive location information of a camera capturing a surrounding environment of the vehicle in which the terminal device 1100 is mounted, from the terminal device 1100.

Before the remote control device 2000 remotely controls the vehicle in which the terminal device 1100 is mounted, the remote control device 2000 may perform negotiation with the terminal device 1100 to form a session for receiving a picture and data about a surrounding environment of the vehicle. The remote control device 2000 may perform whether a driving mode of the vehicle is changed, and when the driving mode of the vehicle is changed from other driving modes to a remote control mode, the remote control device 2000 may perform negotiation with the terminal device 1100 with respect to a picture transmission condition.

The remote control device 2000 according to an embodiment may determine information about a video parameter (for example, a bit rate, a packing structure, etc.) of the packed picture to be received, through a negotiation with the terminal device 1100, and may receive the packed picture based on the determined information. In the process of negotiation between the terminal device 1100 and the remote control device 2000, the remote control device 2000 may receive the location information of the camera. Also, the remote control device 2000 may receive at least one of size information of the vehicle and direction information of the camera.

In operation S2420, the remote control device 2000 according to an embodiment may receive a bitstream including the packed picture from the terminal device 1100.

When the negotiation with the terminal device 1100 is completed, the remote control device 2000 may request the terminal device 1100 to transmit a picture (that is, the packed picture) around the vehicle. The remote control device 2000 according to an embodiment may determine a packing structure based on a driving state of the vehicle and may request the terminal device 1100 to transmit the packed picture based on the determined packing structure. Before the vehicle starts to drive, the remote control device 2000 according to an embodiment may determine the packing structure such that all of the plurality of input pictures included in the packed picture have the same quality or may determine the packing structure as a predetermined default packing structure.

In operation S2430, the remote control device 2000 according to an embodiment may obtain the packed picture from the received bitstream and obtain a plurality of output pictures from the packed picture.

In operation S2440, the remote control device 2000 according to an embodiment may generate a control signal for controlling the vehicle and the packing structure information.

For example, a user of the remote control device 2000 may input a user command for controlling driving of the vehicle into the remote control device 2000 by taking into account the plurality of output pictures obtained in operation S2430. The remote control device 2000 may generate the control signal based on the user command. As another example, the remote control device 2000 may determine a driving direction of the vehicle to reach a destination by analyzing the plurality of output pictures and may generate the control signal based on the driving direction.

Also, the remote control device 2000 according to an embodiment may determine a packing structure based on the control signal. For example, the remote control device 2000 may determine the packing structure such that a picture corresponding to the driving direction of the vehicle is included in the packed picture to have a greater size than other pictures (or such that a resolution of the picture corresponding to the driving direction of the vehicle is greater than a resolution of other pictures).

An example in which the packed picture is generated by combining a first input picture and a second input picture is described. When the control signal for controlling driving of the vehicle, which is transmitted from the remote control device 2000, is for moving the vehicle forward, the remote control device 2000 according to an embodiment may generate the packing structure information such that the first input picture is included in the packed picture to have a greater size (or to have a higher resolution) than the second input picture. When the control signal is for moving the vehicle backward, the remote control device 2000 may generate the packing structure information such that the second input picture is included in the packed picture to have a greater size (or to have a higher resolution) than the first input picture.

In operation S2450, the remote control device 2000 according to an embodiment may transmit the control signal for controlling the vehicle and the packing structure information.

For example, the remote control device 2000 may transmit the packing structure information configured for including a picture indicating a front environment of the vehicle to have a greater size than other pictures, to the terminal device 1100, along with the control signal for moving the vehicle forward.

In operation S2460, the terminal device 1100 according to an embodiment may generate a plurality of projected pictures by adjusting a size of at least one from among the plurality of input pictures or rotating at least one from among the plurality of input pictures, based on the received packing structure information. The terminal device 1100 according to an embodiment may generate the packed picture by combining the plurality of projected pictures.

In operation S2470, the remote control device 2000 according to an embodiment may receive a bitstream including the generated packed picture.

In operation S2480, the remote control device 2000 according to an embodiment may obtain the packed picture from the bitstream and obtain the plurality of output pictures from the packed picture based on the packing structure information.

The remote control device 2000 according to an embodiment may repeat operations S2440 through S2480, until the vehicle ends the remote control driving. Thus, the remote control device 2000 may receive the packed picture, in which data rates of pictures in the packed picture are adaptively changed according to a driving direction of the vehicle. For example, when the driving direction of the vehicle is forward, the remote control device 2000 may request the terminal device 1100 to transmit the packed picture in which a greater data rate is assigned to a front picture of the vehicle. When the driving direction of the vehicle is backward, the remote control device 2000 may request the terminal device 1100 to transmit the packed picture in which a greater data rate is assigned to a rear picture of the vehicle.

The embodiments described above may be realized as a software (S/W) program including instructions stored in computer-readable storage media.

A computer may be a device for calling the instructions stored in the storage media and performing, in response to the called instructions, operations according to the embodiments described above, and may include the terminal device and the remote control device according to the embodiments.

The computer-readable storage medium may include the form of a non-transitory storage medium. Here, the term "non-transitory" may only denote that a storage medium does not include a signal and is tangible, and may not distinguish between semi-permanent and temporary storage of data in the storage medium.

Also, the electronic device or the method according to the embodiments may be included in a computer program product. The computer program product may be purchased as a product between a seller and a purchaser.

The computer program product may include an S/W program or a computer-readable storage medium in which the S/W program is stored. For example, the computer program product may include a product in the form of an S/W program (for example, a downloadable application) that is electronically distributed through a manufacturer of an electronic device or an electronic market (for example, a Google play store or an App store). For electronic distribution, at least a portion of the S/W program may be stored in a storage medium or temporarily generated. In this case, the storage medium may include a server of the manufacturer, a server of the electronic market, or a storage medium of a broadcasting server temporarily storing the S/W program.

The computer program product may include a storage medium of a server or a storage medium of a terminal in a system including the server and the terminal (for example, a terminal device or a remote control device). Alternatively, when there is a third device (for example, a smartphone) connected to the server or the terminal for communication, the computer program product may include a storage medium of the third device. Alternatively, the computer program product may directly include an S/W program transmitted from the server to the terminal or the third device or transmitted from the third device to the terminal.

In this case, any one of the server, the terminal, and the third device may perform the method according to the embodiments by executing the computer program product. Alternatively, at least two of the server, the terminal, and the third device may perform the method according to the embodiments by executing the computer program product in a distributed fashion.

For example, the server (for example, a cloud server or an AI server) may execute a computer program product stored in the server to control the terminal connected to the server for communication to perform the methods according to the embodiments.

As another example, the third device may execute the computer program product to control the terminal connected to the third device for communication to perform the method according to the embodiments. As a detailed example, the third device may remotely control the terminal device or the remote control device to transmit or receive the packed picture.

When the third device executes the computer program product, the third device may download the computer program product from the server and execute the downloaded computer program product. Alternatively, the third device may execute the computer program product provided in a pre-loaded state to perform the method according to the embodiments.

The invention claimed is:

1. A method, performed by a terminal in a wireless communication system, the method comprising:
   transmitting, to a remote control device, location information of a plurality of cameras mounted in a vehicle;
   determining a packing structure based on a driving state of the vehicle;
   receiving, from the plurality of cameras, a plurality of input pictures;
   generating a plurality of projected pictures by adjusting a size of at least one input picture of the plurality of input pictures based on the packing structure;
   generating a packed picture by combining the plurality of projected pictures based on the packing structure;
   encoding the packed picture; and
   transmitting a bitstream including the encoded packed picture,
   wherein the plurality of projected pictures includes a first projected picture and a second projected picture, and
   wherein the determining of the packing structure comprises:
      when the vehicle moves in a first direction, determining the packing structure such that the first projected picture is included in the packed picture to have a greater size than the second projected picture; and
      when the vehicle moves in a second direction, determining the packing structure such that the second projected picture is included in the packed picture to have a greater size than the first projected picture.

2. The method of claim 1, wherein the transmitting of the location information of the plurality of cameras comprises transmitting size information of the vehicle and direction information of the plurality of cameras along with the location information of the plurality of cameras.

3. The method of claim 2, wherein the location information of the plurality of cameras, the size information of the vehicle, and the direction information of the plurality of cameras are indicated as an X-axis value, a Y-axis value, and a Z-axis value on a three-dimensional space.

4. The method of claim 1, further comprising:
receiving a control signal from the remote control device; and
changing a direction of at least one of the plurality of cameras, based on the received control signal.

5. The method of claim 1,
wherein the first direction is forward, and the second direction is backward,
wherein the first projected picture is based on a first input picture received from a forward-facing camera of the plurality of cameras, and
wherein the second projected picture is based on a second input picture received from a backward-facing camera of the plurality of cameras.

6. The method of claim 1, wherein the determining of the packing structure based on the driving state of the vehicle comprises:
receiving a control signal from the remote control device; and
determining the driving state of the vehicle based on the received control signal.

7. The method of claim 1, wherein the transmitting of the bitstream comprises:
generating a supplemental enhancement information (SEI) message including information about the packing structure; and
generating the bitstream composed of network abstraction layer (NAL) units including the encoded packed picture and the SEI message.

8. The method of claim 1, wherein the generating of the plurality of projected pictures further comprises rotating at least one other input picture of the plurality of input pictures based on the packing structure.

9. A terminal in a wireless communication system, the terminal comprising:
a communicator; and
at least one processors coupled with the communicator and configured to:
transmit, to a remote control device, location information of a plurality of cameras mounted in a vehicle,
determine a packing structure based on a driving state of the vehicle,
receive, from the plurality of cameras, a plurality of input pictures,
generate a plurality of projected pictures by adjusting a size of at least one input picture of the plurality of input pictures based on the packing structure,
generate a packed picture by combining the plurality of projected pictures based on the packing structure,
encode the packed picture, and
transmit a bitstream including the encoded packed picture,
wherein the plurality of projected pictures includes a first projected picture and a second projected picture,
wherein, when the vehicle moves in a first direction, the packing structure is determined such that the first projected picture is included in the packed picture to have a greater size than the second projected picture, and
wherein, when the vehicle moves in a second direction, the packing structure is determined such that the second projected picture is included in the packed picture to have a greater size than the first projected picture.

10. The terminal of claim 9,
wherein the first direction is forward, and the second direction is backward,
wherein the first projected picture is based on a first input picture received from a forward-facing camera of the plurality of cameras, and
wherein the second projected picture is based on a second input picture received from a backward-facing camera of the plurality of cameras.

11. The terminal of claim 9, wherein the at least one processor is configured to:
rotate at least one other input picture of the plurality of input pictures based on the packing structure.

12. A method performed by a remote control device in a wireless communication system, the method comprising:
receiving location information of a plurality of cameras mounted in a vehicle from a terminal device;
transmitting a control signal for controlling driving of the vehicle and packing structure information, wherein the packing structure information is based on a driving state of the vehicle;
receiving an encoded bitstream;
decoding the encoded bitstream;
obtaining a packed picture from the decoded bitstream;
obtaining a plurality of projected pictures from the packed picture based on the packing structure information;
obtaining a plurality of output pictures from the plurality of projected pictures by adjusting a size of at least one projected picture of the plurality of projected pictures based on the packing structure information; and
outputting the plurality of output pictures,
wherein the plurality of projected pictures includes a first projected picture and a second projected picture,
wherein the packing structure information comprises information that the first projected picture has a greater size than the second projected picture when the vehicle moves in a first direction, and
wherein the packing structure information comprises information that the second projected picture has a greater size than the first projected picture when the vehicle moves in a second direction.

13. The method of claim 12, wherein the receiving of the location information of the plurality of cameras comprises receiving size information of the vehicle and direction information of the plurality of cameras along with the location information of the plurality of cameras.

14. The method of claim 13, wherein the location information of the plurality of cameras, the size information of the vehicle, and the direction information of the plurality of cameras are indicated as an X-axis value, a Y-axis value, and a Z-axis value on a three-dimensional space.

15. The method of claim 12, further comprising transmitting, to the terminal device, a control signal for changing a direction of at least one of the plurality of cameras.

* * * * *